United States Patent [19]

Kimura et al.

[11] Patent Number: 5,812,189
[45] Date of Patent: Sep. 22, 1998

[54] VIDEO CAMERA APPARATUS

[75] Inventors: Kenichi Kimura; Futoshi Kai, both of Kawasaki; Masahiko Tsuzuki, Kawaguchi; Takashi Watanabe, Fuchu; Harunobu Ichinose, Yokohama, all of Japan

[73] Assignee: Canon Kabushiki Kaisha, Tokyo, Japan

[21] Appl. No.: 519,592

[22] Filed: Aug. 24, 1995

Related U.S. Application Data

[63] Continuation of Ser. No. 79,448, Jun. 18, 1993, abandoned.

[30]     Foreign Application Priority Data

Jun. 23, 1992  [JP]  Japan ................................. 4-164871
Jun. 29, 1992  [JP]  Japan ................................. 4-196337
Dec. 28, 1992  [JP]  Japan ................................. 4-361622

[51] Int. Cl.⁶ ................................................ H04N 5/262
[52] U.S. Cl. ............................................ 348/240; 348/369
[58] Field of Search ................................. 348/207, 239, 348/240, 358, 335, 369; 358/906; H04N 5/225

[56] References Cited

U.S. PATENT DOCUMENTS 4,843,475  6/1989  Imai ......................................... 348/358

FOREIGN PATENT DOCUMENTS 0490274  3/1992  Japan ............................. H04N 5/232

*Primary Examiner*—Andrew I. Faile
*Assistant Examiner*—Tuan V. Ho
*Attorney, Agent, or Firm*—Robin, Blecker & Daley

[57]     ABSTRACT

An image sensing apparatus comprising an electronic zooming function and an optical system capable of varying a focal distance. The image sensing apparatus includes a control circuit for making control when the focal distance of the optical system is changed under photographing on condition that the optical system is positioned at the tele end and magnification of an image sensing device is changed in a region where the electronic zooming function is to be effected, such that the electronic zooming function is effected to change the magnification of the image sensing device to the wide side.

20 Claims, 19 Drawing Sheets

IMAGE PLANE ILLUMINANCE CHANGE
WHEN LENS DIAMETER IS DETERMINED
ONLY BY FNo

IMAGE HEIGHT FOR MAINTAINING
IMAGE PLANE ILLUMINANCE AT $E_0$

VIDEO CAMERA APPARATUS

This is a continuation application under 37 CFR 1.62 of prior application Ser. No. 08/079,448, filed Jun. 18, 1993, abandoned.

BACKGROUND OF THE INVENTION

1. Field of the Invention

The present invention relates to an image sensing apparatus such as a video camera.

2. Related Background Art

Recently, with the remarkable development and expanding use of video cameras or the like, there have been achieved the provision of multiple functions covering more aspects and an improvement of operability.

As one example, magnification of zoom lenses has been increased. In recent video cameras, the so-called electronic zooming for electronically enlarging an image has been employed in combination with optical zooming to realize a higher degree of magnification. This type video camera is usually arranged to start an electronic zoom function from only the tele (telephoto) end of an optical system having a zoom function.

Meanwhile, conventional image sensing apparatus include digital zoom means for enlarging a part of sensed image information focused on the image sensing plane of an image sensing device through a digital conversion process and providing it as data for one picture. Because the digital zoom lens performs zooming by enlarging the sensed image information at the tele end of an optical system, the apparatus is arranged to carry out the zooming by an electric zoom switch such as a seesaw button so that the optical zooming and the digital zooming are smoothly combined with each other.

The above-mentioned prior art has however suffered from a problem below. If a zoom operation ring is manually operated to change the focal distance toward the wide (wide-angle) side under photographing on condition that the optical system is positioned at the tele end and the magnification of the image sensing device (CCD: Charged Coupled Device) is changed for the electronic zooming, the focal distance of the optical system is resulted from addition of a value corresponding to the magnification of the image sensing device in the electronic zooming.

Another problem has occurred in that because of electric-powered zooming effected upon manual operation of the electric zoom switch, it is impossible to perform manual zooming over the entire zoom range by using a manual zoom operating member such as a zoom operation lever.

SUMMARY OF THE INVENTION

The present invention has been made in view of the state of art as mentioned above, and its first object is to provide an image sensing apparatus in which optical zooming and electronic zooming are controlled by manually operating a zoom operation lever in an optimum manner.

A second object of the present invention is to provide an image sensing apparatus in which even if the focal distance is manually changed toward the wide side under photographing on condition that an optical system is positioned at the tele end and magnification of an image sensing device is changed, the focal distance of the optical system is not resulted from addition of a value corresponding to the magnification of the image sensing device, thereby enabling the normal photographing.

A third object of the present invention is to provide an image sensing apparatus in which manual zooming is enabled in an optical zoom region.

To achieve the above first and second objects, according to a preferred embodiment of the present invention, there is disclosed an image sensing apparatus comprising an electronic zooming function and an optical system capable of varying a focal distance, wherein the image sensing apparatus includes control means for making control when the focal distance of the optical system is changed under photographing on condition that the optical system is positioned at the tele end and magnification of image sensing means is changed in a region where the electronic zooming function is to be effected, such that the electronic zooming function is effected to change the magnification of the image sensing means to the wide side.

To achieve the above third object, according to a preferred embodiment of the present invention, there is disclosed an image sensing apparatus comprising a photographing optical system having a zooming optical system, photoelectric conversion means for receiving an object image coming through the photographing optical system and converting the object image into an electric image signal, manual zoom operating member through which the zooming optical system is manually operated, digital conversion means for enlarging a part of the electric image signal to data for one picture, and storing means for storing the manual zoom operating member in a body of the image sensing apparatus in a digital zoom region where the digital conversion means is to be actuated.

A fourth object of the present invention is to provide an image sensing apparatus in which when the focal distance is manually changed toward the wide side under photographing on condition that an optical system is positioned at the tele end and magnification of an image sensing device is changed, the photographing is continued by setting the magnification of the image sensing device back to one.

A fifth object of the present invention is to provide an image sensing apparatus in which a manual zoom operating member is stored in a body of the image sensing apparatus in the digital zoom lens.

A sixth object of the present invention is to provide a video camera in which when the size of an effective image circle of a zoom lens becomes notedly small, i.e., when the maximum image height is lowered, trimming on a solid state image sensing device (so-called electronic zooming) is performed on the camera side in a region corresponding to the effective image circle.

To achieve these objects, according to a preferred embodiment of the present invention, there is disclosed an image sensing apparatus comprising image sensing means for converting an image focused by a zoom lens into an electric signal, detection means for detecting a focal distance state of the zoom lens, and processing means for processing the electric signal for compensation corresponding to an effective picture size of the zoom lens variable depending on the focal distance state, whereby an image region corresponding to the effective picture size is enlarged on a monitor.

A seventh object of the present invention is to provide a video camera provided with an inner focusing type lens in which focusing control under zooming is surely carried out over the entire adjustable range of zoom magnification without degrading image quality.

An eighth object of the present invention is to provide a video camera in which the positions of focus and zoom lenses corresponding to the preset object distance and magnification are stored and those lenses are momentarily moved to their corresponding positions to thereby enable high-speed control without causing a blur.

To achieve the above seventh object, according to a preferred embodiment of the present invention, there is disclosed a video camera comprising memory means for storing loci of in-focus positions of a focus lens corresponding to plural positions of a zoom lens for each of plural object distances, first drive means for driving the zoom lens, second drive means for driving the focus lens, electronic zooming means for performing zoom control based on a video signal obtained by photographing, first control means for performing zoom control by the electronic zooming means in an initial stage of zooming and simultaneously driving the focus lens by the second drive means to perform focusing control, selection means for selecting the locus in the memory means corresponding to positions of the zoom lens and the focus lens at the time the control by the first control means has ended, when the zoom control is performed in succession to the zoom control in the initial stage by the first control means, and second control means for controlling the first drive means to move the zoom lens and simultaneously controlling the second drive means so that the focus lens moves following the zoom lens in accordance with the locus selected by the selection means.

To achieve the above eighth object, according to a preferred embodiment of the present invention, there is disclosed a video camera comprising memory means for storing a position of a zoom lens and an in-focus position of a focus lens corresponding to the position of the zoom lens at an arbitrary instant in time during photographing, first drive means for driving the zoom lens, second drive means for driving the focus lens, instruction means for instructing lens movement in accordance with the data stored in the memory means, and control means for, in response to an instruction from the instruction means, controlling the first drive means to move the zoom lens to the position stored in the memory means and controlling the second drive means to move the focus lens to the in-focus position stored in the memory means when the zoom lens is moved.

Further, to achieve the above eighth object, there is disclosed a video camera provided with inhibit means for inhibiting recording while the zoom lens and the focus lens are being moved under control of the control means.

Other objects and features of the present invention will be apparent from the following detailed description and the attached drawings.

DETAILED DESCRIPTION OF THE PREFERRED EMBODIMENTS

Several embodiments of the present invention will be hereinafter described with reference to the drawings.

[First Embodiment]

Figure 1:
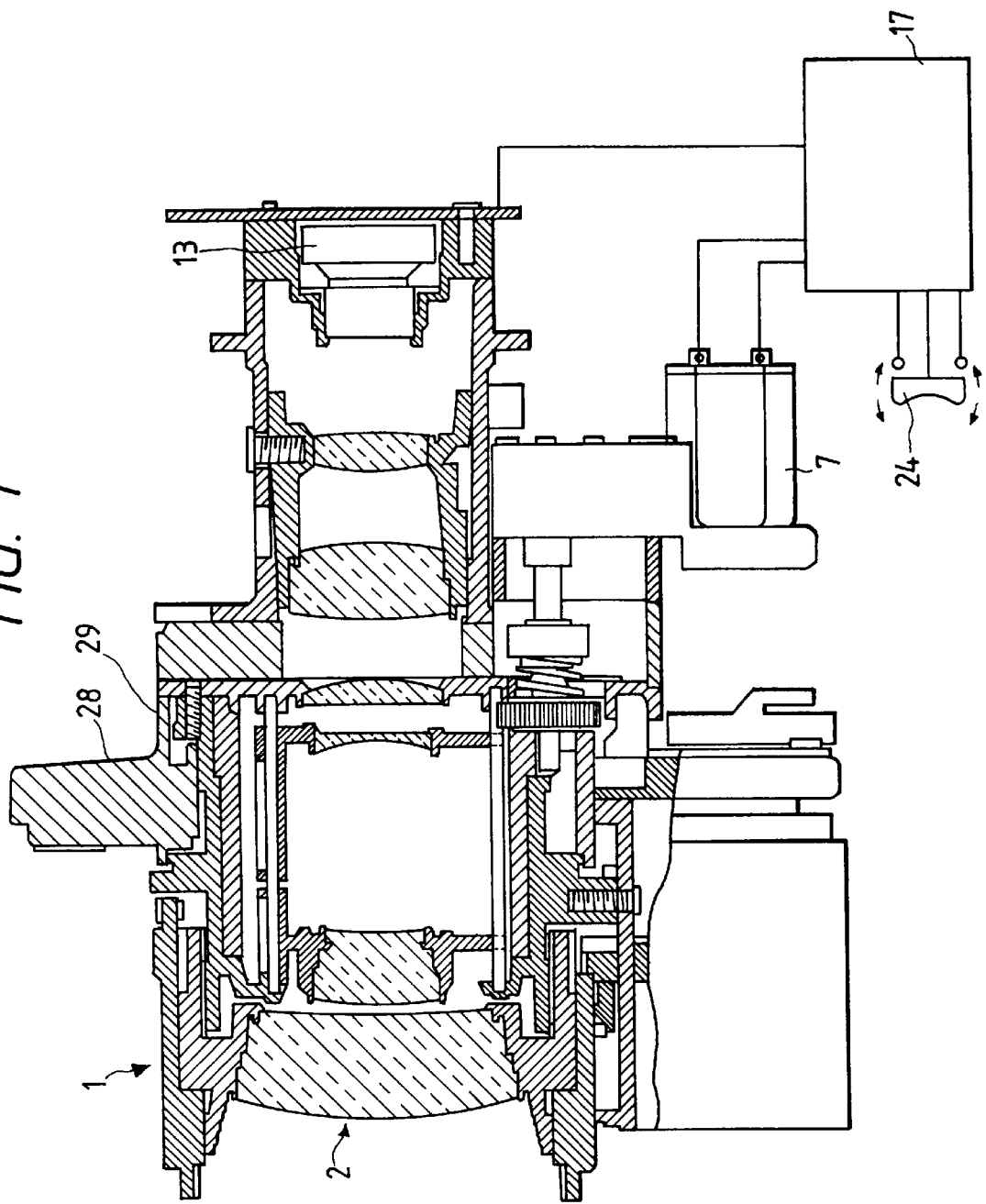
FIG. 1 is a sectional view showing the construction of an image sensing apparatus according to a first embodiment of the present invention.
Figure 2:
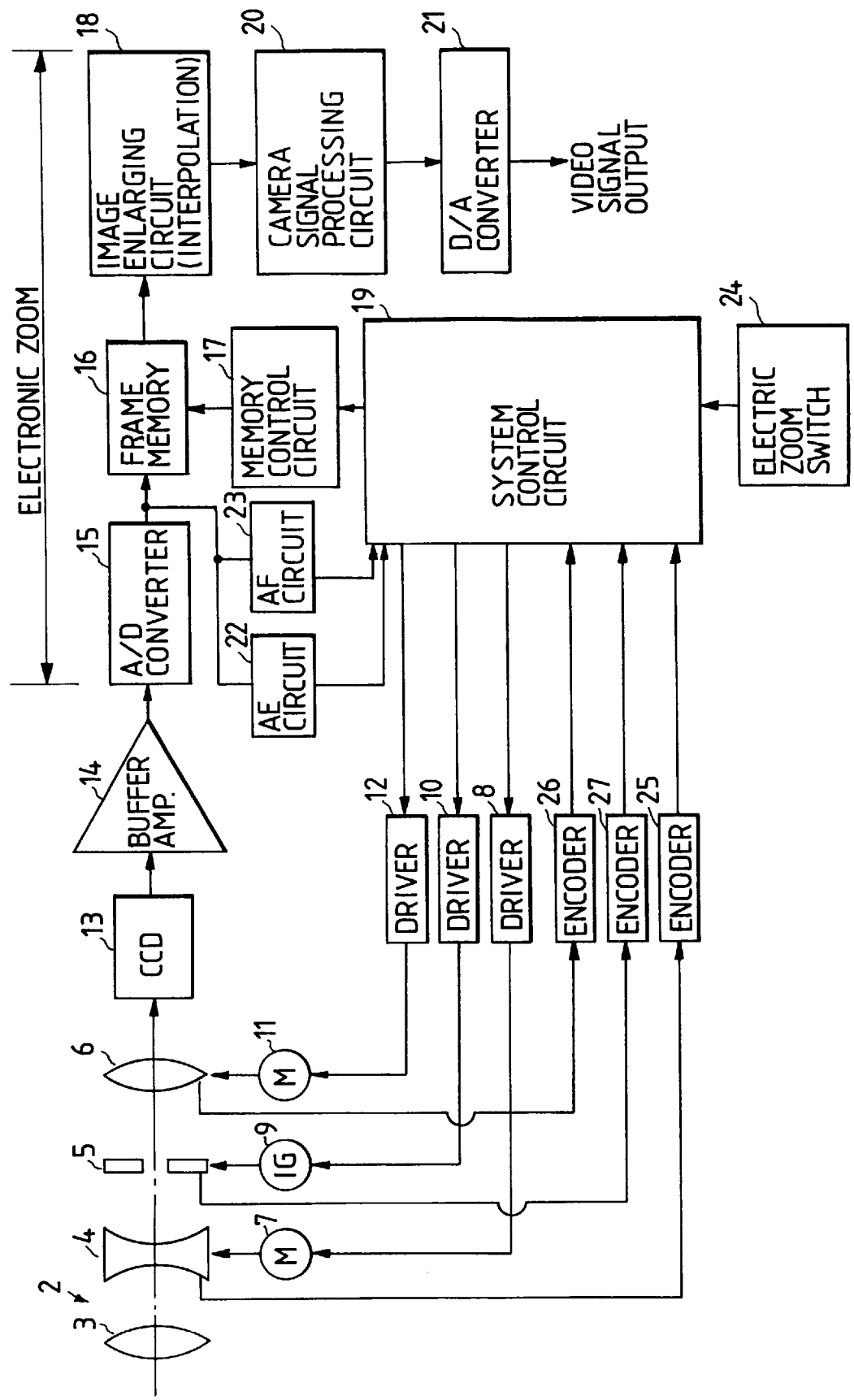
FIG. 2 is a block diagram showing the construction of the image sensing apparatus of FIG. 1.

FIG. 1 is a sectional view showing the construction of a video camera representing an image sensing apparatus according to a first embodiment of the present invention, and FIG. 2 is a block diagram of the video camera. In FIGS. 1 and 2, denoted by reference numeral 1 is a video camera body in which a photographing lens 2 as a photographing optical system is provided. The photographing lens 2 comprises a fixed front lens 3, a zoom lens 4, an iris 5 and a focus lens 6.

As shown in FIG. 2, the zoom lens 4 is driven by a zoom motor 7 and an associated driver 8, the iris 5 is driven by an IG meter 9 and an associated driver 10, and further the focus lens 6 is driven by a focus motor 11 and an associated driver 12, respectively, in accordance with commands from a system control circuit 19 described later.

Denoted by 13 is an image sensing device such as a CCD for making photoelectric conversion of an object image focused by the photographing lens 2 and outputting a sensed image signal, 14 is a buffer amplifier, 15 is an A/D converter for converting the sensed image signal in the form of an analog signal into a digital signal, 16 is a frame memory for storing the sensed image signal converted into a digital signal by the A/D converter 15 in units of a frame, for example, and 17 is a memory control circuit for controlling the rate and the address in writing and reading an image into and out of the frame memory 16. The memory control circuit 17 enables any desired area of the image stored in the frame memory 16 to be read out. Accordingly, it is possible to perform zooming in an electronic manner by reading a partial area of the image stored in the frame memory 16, processing the read data by interpolation, and enlarging it to the size of one picture. This function is called electronic zooming in the present invention.

Denoted by 18 is an image enlarging circuit for enlarging the image data read out of the frame memory 16. In other words, for performing the electronic zooming function, the image enlarging circuit 18 serves to enlarge the image data partially read out of the frame memory 16 to the angle of view corresponding to one picture, and also performs interpolation between pixels to compensate for enlargement of the image. Accordingly, when the whole of one picture is read out of the frame memory 16, the scaling factor is "1". Further, the image enlarging circuit 18 is operated under control of a system control circuit 19 so that the read image is always equal to the size of one picture, in cooperation with the memory control circuit 17 which is operated to vary the range of an image read out of the frame memory 16.

Denoted by 20 is a camera signal processing circuit for executing predetermined signal processing on the sensed image signal, as it is in the form of a digital signal, output from the image enlarging circuit 18 and converting it into a video signal, and 21 is a D/A converter for converting the sensed image signal in the form of a digital signal into an analog signal and outputting it as an analog video signal. The sensed image signal output from the image sensing device 13 and obtained through the A/D converter 15 is also supplied to an AE (Automatic Exposure) circuit 22 and an AF (Automatic Focusing) circuit 23 to produce an exposure detection signal indicative of an exposure state and a focus detection signal indicative of a focused state, respectively, these detection signals being both supplied to the system control circuit 19.

The system control circuit 19 calculates an exposure control signal based on the exposure detection signal output from the AE circuit 22, and delivers it to the driver 10 for the iris 5 so that the iris 5 is controlled to take a proper exposure state. The system control circuit 19 also calculates a focus control signal based on the focus detection signal output from the AF circuit 23, and delivers it to the driver 12 for the focus lens 6 so that the focus lens 6 is controlled to move into an in-focus position.

When an electric zoom lens 24 is manually operated, it outputs depending on a manipulated condition a control signal to the driver 8 for the zoom lens 4 so that the zoom lens 4 is driven to effect the optical zooming, or a control signal to effect the electronic zooming. Operation of the optical zooming and the electronic zooming is controlled by the system control circuit 19. This point constitutes an important part of the present invention and will be described later in detail.

Additionally, information on positions of the zoom lens 4, the focus lens 6 and the iris 5 for use in various kinds of control is detected by respective encoders 25, 26, 27 and supplied to the system control circuit 19.

The system control circuit 19 synthetically executes all kinds of control including the above-mentioned control of the zoom lens 4, the focus lens 6 and the iris 5, the electronic zooming function by the frame memory 16 and the image enlarging circuit 18, as well as other signal processing, and it comprises a microcomputer. Then, operation of the video camera of this embodiment is also controlled by the system control circuit 19. Incidentally, 28 in FIG. 1 denotes a zoom operation lever (manual zoom operating member) provided on a zoom operation ring 29.

The foregoing is the basic construction of the image sensing apparatus of this embodiment.

Operation and control of the video camera thus constructed will now be described with reference to FIGS. 3 and 4.

Figure 3:
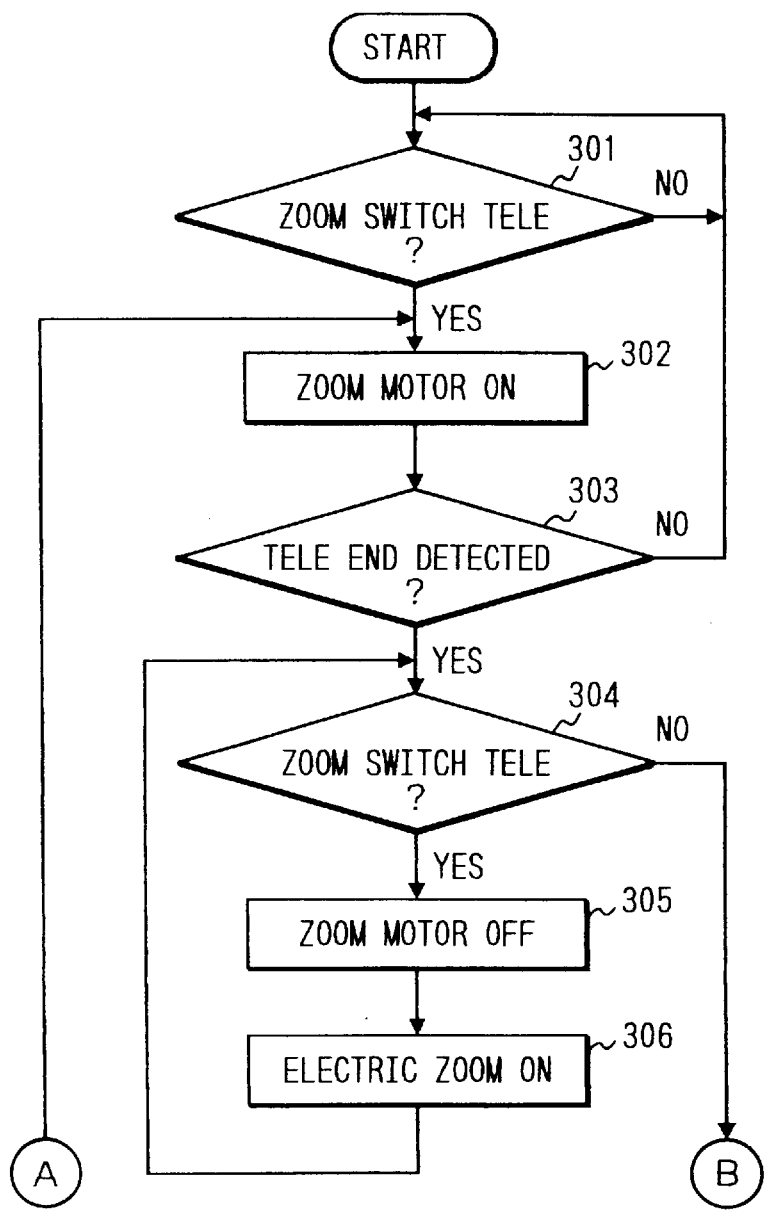
FIG. 3 is a flowchart showing control procedures for the image sensing apparatus of FIG. 1.
Figure 4:
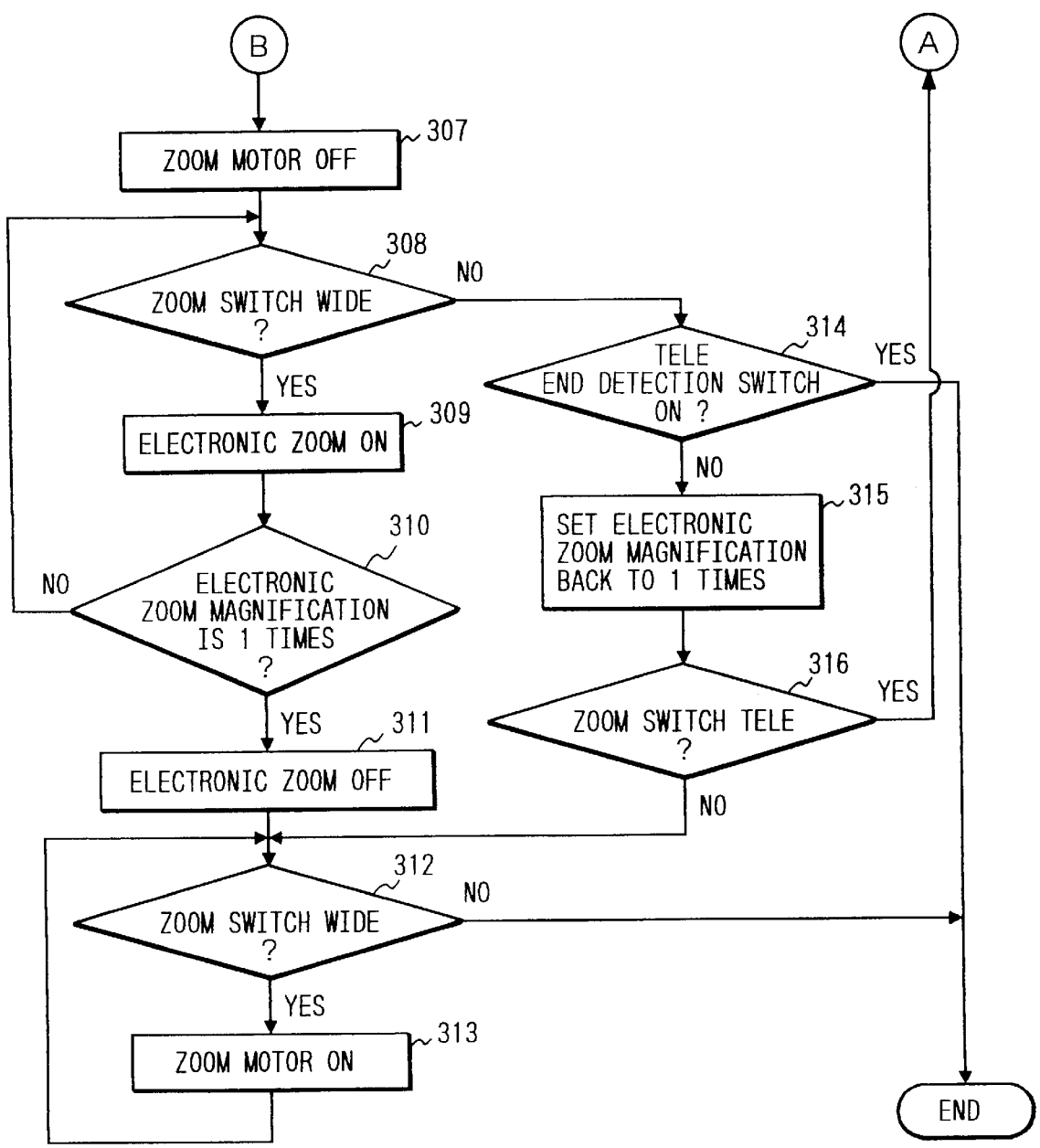
FIG. 4 is a flowchart showing control procedures for the image sensing apparatus of FIG. 1.

FIGS. 3 and 4 are flowcharts showing control procedures for the image sensing apparatus of this embodiment. First, steps 301 and 302 in FIG. 3 represent a condition that the electric zoom switch 24 is being manually operated to move the focal distance toward the tele side. During the optical zooming, the optical focus position is detected, i.e., whether the focal distance is moved to the tele end or not is detected (step 303). If the electric zoom switch 24 is kept turned on (step 304) after reaching to the tele end has been detected in step 303, then the zoom motor 7 is turned off (step 305) and the electronic zooming is turned on to start (step 306).

If the electric zoom switch 24 is turned off in step 304, then the flow goes to step 307 in FIG. 4 where the zoom motor 7 is turned off for bringing the control system into a standby state. If the electric zoom switch 24 is turned on in the standby state to move toward the wide end (step 308), then the electronic zooming is turned on to move the focal distance toward the wide end by setting the magnification of the electronic zooming to a lower value (step 309). If the magnification of the electronic zooming becomes one (step 310), then the electronic zooming is turned off (step 311). If the electric zoom switch 24 is kept depressed even after that (step 312), then the zoom motor 7 is turned on to operate under control of the system control circuit 19 (step 313), whereby the zoom operation ring 29 connected to the zoom motor 7 through a gear mechanism is rotated for changing the focal distance.

When the zoom operation ring 29 is manually rotated from the standby state of step 307 in FIG. 4 with the electric zoom switch 24 kept turned off (step 308), a tele end detection switch is changed over from an on-state to an off-state (step 314) and the magnification of the electronic zooming is forcibly set back to one (step 315), making the control system wait for an input from the electric zoom switch 24 (step 316).

If the electric zoom switch 24 is turned on the tele side (step 316), then the flow returns to step 302 in FIG. 3 for carrying out the tele zooming. If it is not turned on the tele side, meaning non-operation or wide zooming, then the flow goes to step 312 in FIG. 4 and further to step 313 for carrying out the wide zooming upon the electric zoom switch 24 being turned on the wide side. In the case of non-operation, the control operation is ended.

[Second Embodiment]

Next, a second embodiment of the present invention will be described with reference to FIGS. 5 and 6.

The construction of an image sensing apparatus of this embodiment is the same construction as that of the above first embodiment and hence will be apparent from the foregoing description with reference to FIGS. 1 and 2.

Figure 5:
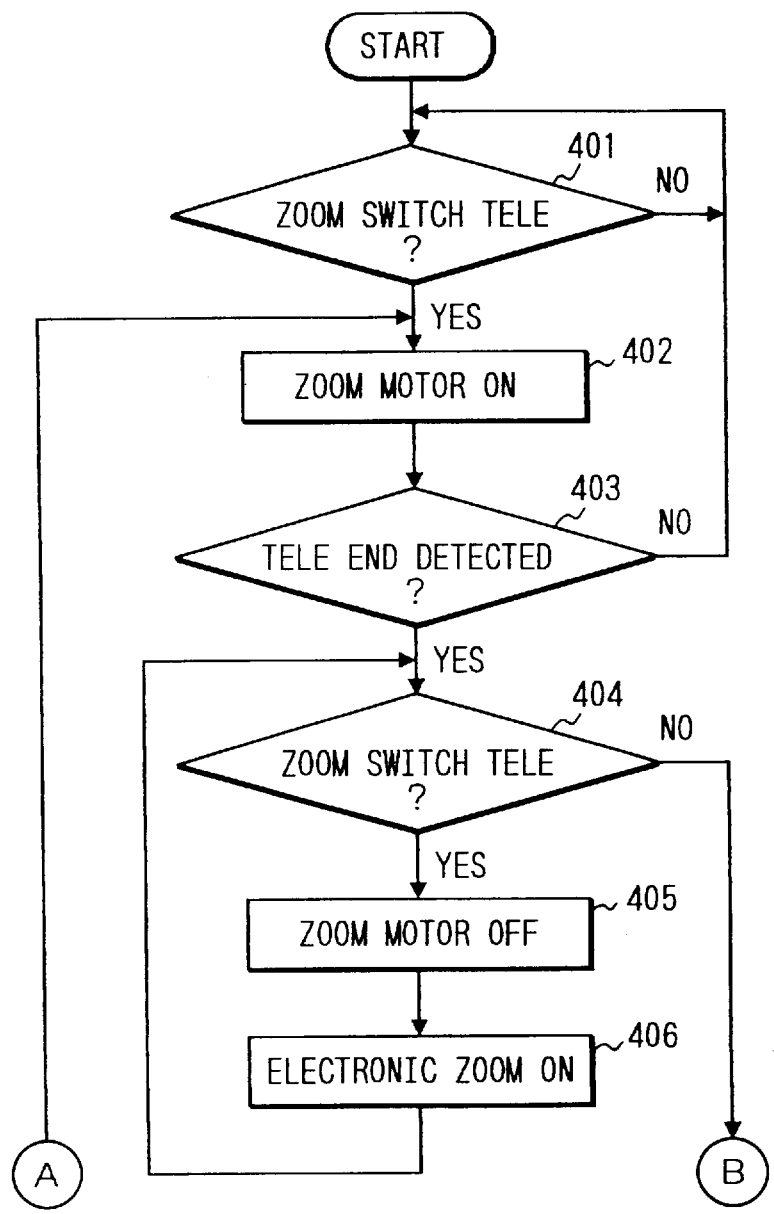
FIG. 5 is a flowchart showing control procedures for an image sensing apparatus according to a second embodiment of the present invention.
Figure 6:
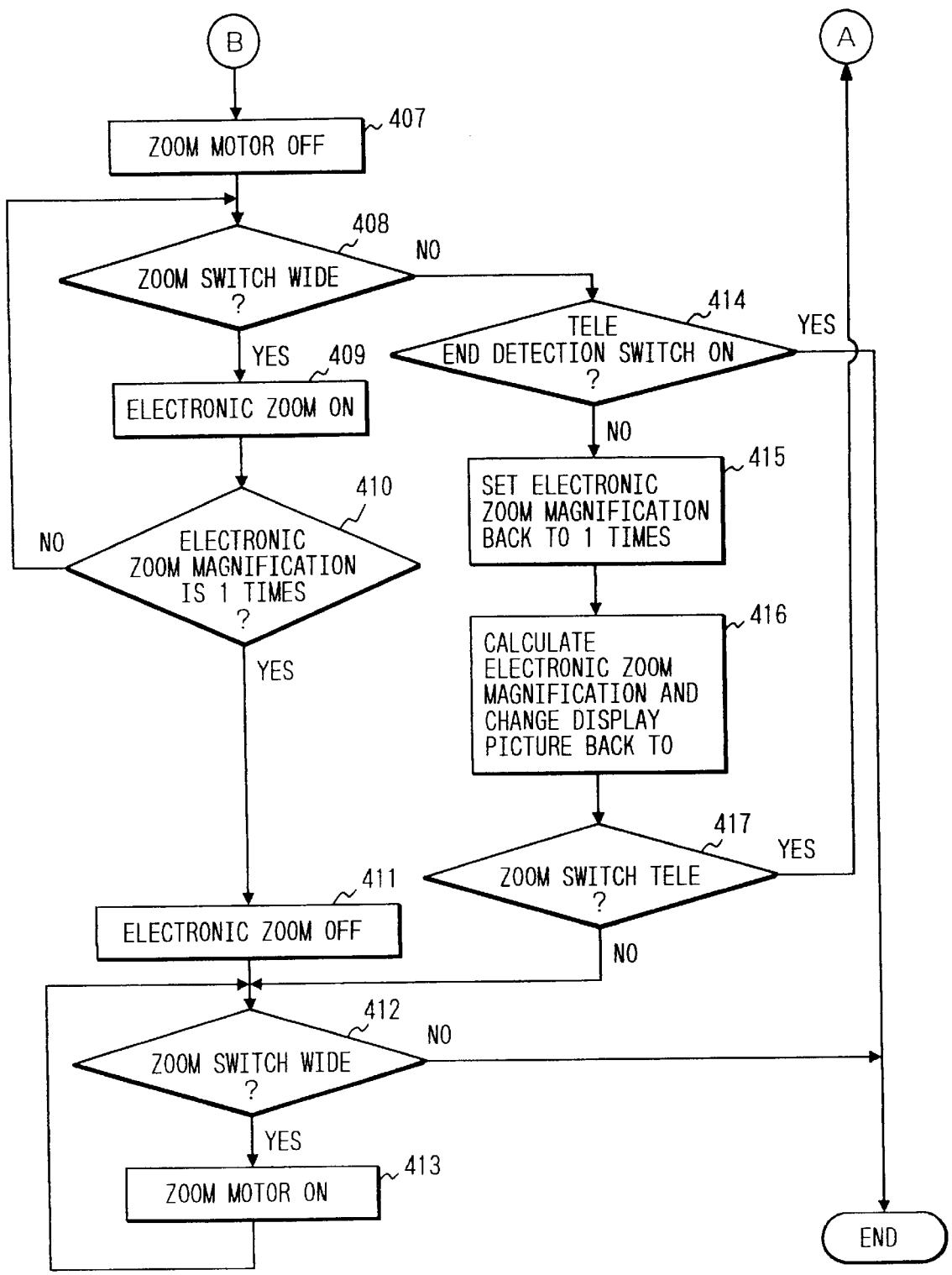
FIG. 6 is a flowchart showing control procedures of the image sensing apparatus of FIG. 5.

Step 401 to step 415 in FIGS. 5 and 6 are the same as step 301 to step 315 in FIGS. 3 and 4 for the above first embodiment, respectively, and hence will not be explained herein.

When the magnification of the electronic zooming is set back to one in step 415 of FIG. 6, the magnification of the electronic zooming between the current value and one is divided into plural values (step 416) so that the picture will not be changed in one step, followed by making the control system wait for an input from the electric zoom switch 24 (step 417).

If the electric zoom switch 24 is turned on the tele side, then the flow returns to step 402 in FIG. 5 for carrying out the tele zooming. If it is not turned on the tele side, meaning non-operation or wide zooming, then the flow goes to step 412 in FIG. 6 and further to step 413 for carrying out the wide zooming upon the electric zoom switch 24 being turned on the wide side. In the case of non-operation, the control operation is ended.

[Third Embodiment]

Next, a third embodiment of the present invention will be described with reference to FIGS. 7 to 10.

Since the basic construction of an image sensing apparatus of this embodiment is the same construction as that of the above first embodiment, the same parts as those in the first embodiment will be explained using the same reference numerals with reference to FIG. 2 as well.

Figure 7:
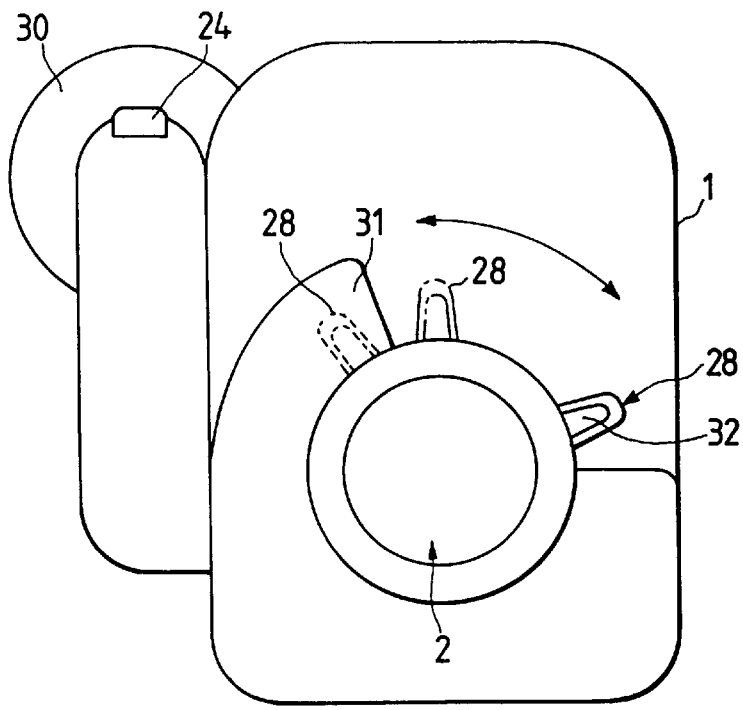
FIG. 7 is a front view of an image sensing apparatus according to a third embodiment of the present invention.

FIG. 7 is a front view of a video camera representing an image sensing apparatus according to a third embodiment of the present invention. In FIG. 7, denoted by 30 is a viewfinder mounted to the video camera body 1, 31 is a storing portion (storing means) provided on the video camera body 1 for storing the zoom operation lever 28 therein, and 32 is a wide macro switch provided on the zoom operation lever 28 for entering a wide macro region.

When the zoom operation lever 28 is manually operated to perform the zooming, it can be manipulated only in an optical zoom region and the wide macro region. Only in the case of zooming effected by the electric zoom switch 24, an electronic zoom region can be entered from the tele end of the optical zooming by the digital conversion means carrying out a digital process.

Figure 8:
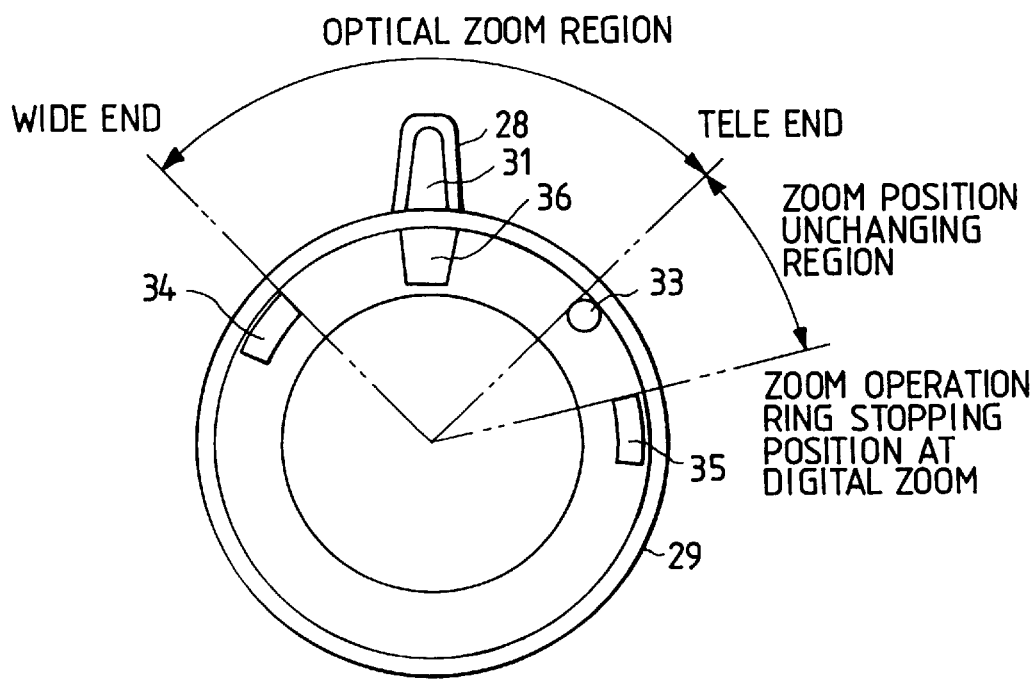
FIG. 8 is an illustration showing a range of movement for the zooming and means for the zooming movement in the image sensing apparatus of FIG. 7.

FIG. 8 shows a range of movement for the zooming and means for the zooming movement. In FIG. 8, denoted by 33 is a zoom tele end stopper, 34 is a zoom wide end stopper, 35 is a stopper for the digital zoom region, and 36 is an abutting portion cooperating the zoom operation ring 29 and coming into abutment against the stoppers 34, 35 to determine the entire zoom region. In the case of the manual zooming (effected by the zoom operation lever 28), the lever 28 is movable in the range from the zoom tele end stopper 33 to the zoom wide end stopper 34.

Figure 9:
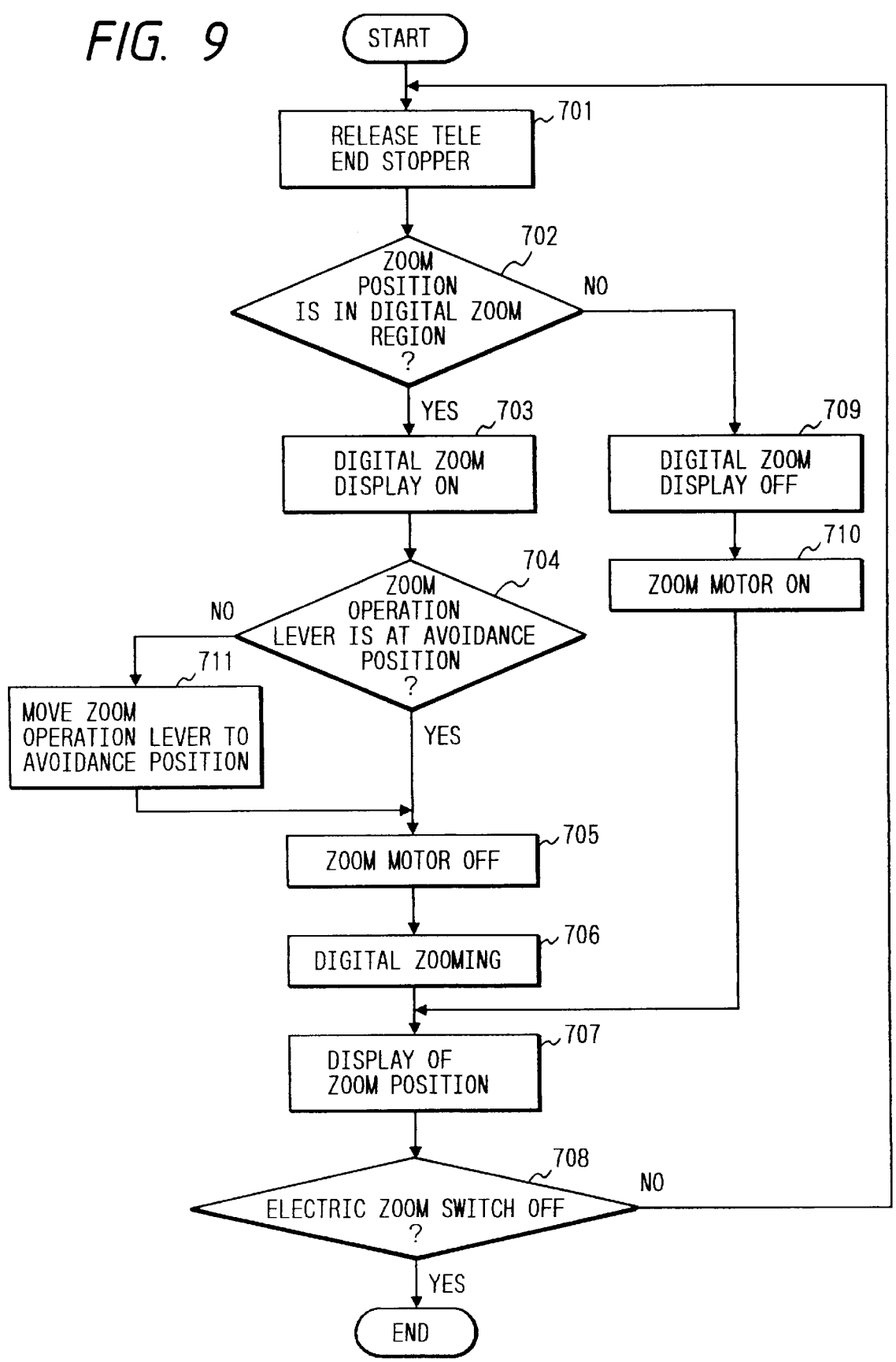
FIG. 9 is a flowchart showing control procedures for the image sensing apparatus of FIG. 7.
Figure 10:
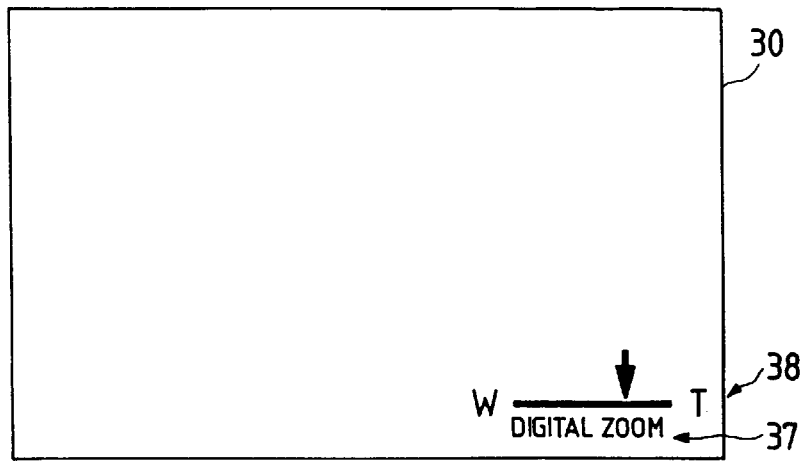
FIG. 10 is an illustration showing an information display state in a viewfinder of the image sensing apparatus of FIG. 7.

FIG. 9 is a flowchart showing control procedures in the electric-powered zooming, and FIG. 10 is an illustration showing an information display state in the viewfinder 30 during the electric-powered zooming.

First, in FIG. 9, when the electric-powered zooming is under operation, the zoom tele end stopper 33 in FIG. 8 is released in step 701. Next step 702 determines whether the current zoom position is in the digital zoom region or not. If it is in the digital zoom region, then the flow goes to step 703. In step 703, a display 37 shown in FIG. 10 is indicated in the viewfinder 30 to inform that the zoom position is in the digital zoom region. Next step 704 determines whether the zoom operation lever 28 is now stored in the storing portion 31 or not (i.e., whether it is in a retracted position or not). If the zoom operation lever 28 is not stored, then the flow goes to step 711 where the zoom operation lever 28 is stored into the storing portion 31 of the video camera body 1 (as indicated by dotted lines in FIG. 7) and stopped at the position of the stopper 35 for the digital zoom region, followed by going to step 705. In step 705, the zoom motor 7 is turned off to keep the zoom operation ring 29 unchanged in its position, whereas a part of the sensed image information at the tele end is enlarged to one picture, thereby carrying out the digital zooming in step 706.

Meanwhile, if the zoom position is in the optical zoom region in step 702, then the flow goes to step 709 where the display 37 shown in FIG. 10 is not indicated in the viewfinder 30. In the next step 710, the zoom motor 7 is turned on to perform the optical zooming, followed by going to step 707. In step 707, a zoom position display such as a display 38 shown in FIG. 10 is indicated to inform where is the current zoom position. After that, step 708 determines whether the electric zoom switch 24 is turned off or not. If it is not turned off, then the flow returns to the above step 701 for repeating a series of the same operation steps as explained above again. If it is turned off, then the control operation is ended.

Incidentally, the position of the zoom operation ring 29 is detected by an encoder or a zoom region pattern, etc. provided on the zoom operation ring 29.

As described above, with any of the image sensing apparatus of the above embodiments, when the focal distance is manually changed toward the wide side under photographing on condition that an image sensing optical system is positioned at the tele end and magnification of an image sensing device is changed, the photographing is continued by setting the magnification of the image sensing device back to one, whereby the focal distance of the image sensing optical system is not resulted from addition of a value corresponding to the magnification of the image sensing device, thus enabling the normal photographing.

Also, with the image sensing apparatus of the above third embodiment, since the manual zoom operating member is stored in the apparatus body during the digital zooming so that it can be manually operated to perform zooming only in the optical zoom region, the optical zoom region and the digital zoom region are smoothly combined with each other, and the manual zoom operating member can be prevented from being erroneously manipulated during the digital zooming.

While the above first to third embodiments are intended to, in a video camera having both functions of optical zooming and electronic zooming, smoothly and surely perform the optical zoom operation and the electronic zoom operation, as well as naturally make transition between the optical zoom operation and the electronic zoom operation, the following fourth embodiment is concerned with the case where the electronic zooming is applied to zooming of an image as a function of cameras.

In other words, the following fourth embodiment shows novel use of the electronic zooming in point of that when the size of an effective image circle of an optical zoom lens becomes notedly small, a region corresponding to the effective image circle is obtained from an image sensing device by using the electronic zooming.

[Fourth Embodiment]

A description will be given of the background of the fourth embodiment and then the construction and operation thereof.

Figure 11:
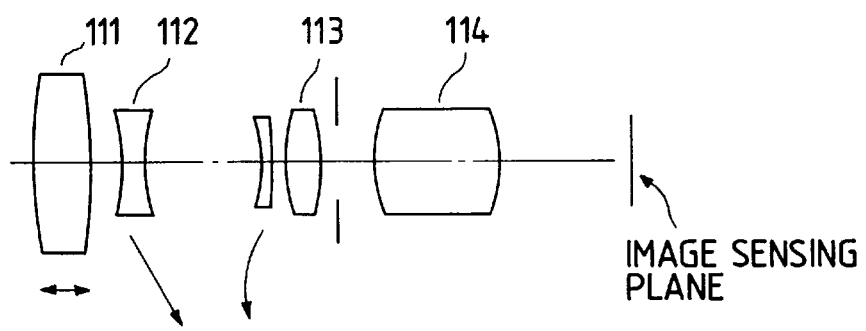
FIG. 11 is an illustration showing the construction of a general zoom lens of front lens focusing type.

FIG. 11 shows a general zoom lens which has been conventionally mounted on image sensing apparatus using solid state image sensing devices such as CCDs. Looking from the front side along the optical axis, a first lens group serves as a lens 111 for adjusting a focus, a second lens group serves as a lens 112 for zooming, and a third lens group serves as a lens group 113 for compensating movement of the image plane due to the zooming. The second and third lens groups are moved along respective predetermined zoom loci in a combined manner, thereby achieving zoom operation. Additionally, a fourth lens group serves as a fixed lens group 114 for focusing an image.

In the case of the illustrated 4-group zoom lens, the lens diameter of the first lens group, i.e., the so-called front lens diameter, is usually determined such that the maximum image height will not be subjected to vignetting at the wide end when an object at the shortest range is photographed.

Figure 12:
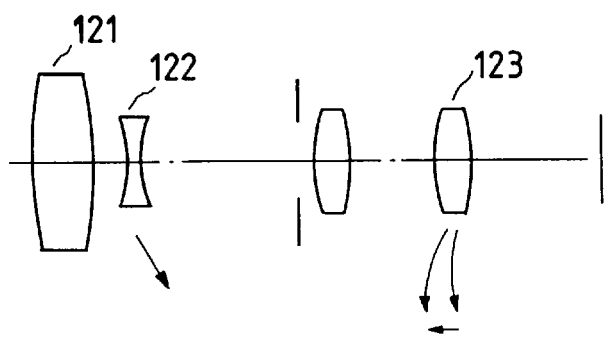
FIG. 12 is an illustration showing the construction of a general zoom lens of rear lens focusing type.

Meanwhile, there is also known a zoom lens of so-called inner focusing type that the third or subsequent lens group serves to make focal adjustment for the purposes of suppressing an increase in the front lens diameter of the 4-group zoom lens and lessening the weight of the lens group used for the focal adjustment. This type zoom lens is schematically shown in FIG. 12. In the case of the zoom lens of inner focusing type, the front lens diameter is often determined unlike the zoom lens of front lens focusing type such that the maximum image height will not be subjected to vignetting for an object at infinity in the intermediate zoom region rather than the nearest object at the wide end.

Denoted by 121 is a fixed front lens, 122 is a zoom lens, and 123 is a focus compensation lens for compensating movement of the focal plane due to the zooming.

However, the 4-group zoom lens of front lens focusing type has had a drawback that because the front lens diameter is determined by conditions of photographing the nearest object at the wide end, a reduction in the front lens diameter and hence the zoom lens size must be achieved at such a sacrifice in specifications as increasing the shortest photographing distance or the F number of the lens. On the other hand, the zoom lens of inner focusing type can reduce the front lens diameter to some extent by properly designing distribution of the refractive power among the respective lens groups, the focal distance of the entire optical system and/or the F number, as mentioned above, but it has been disadvantageous in that the entire lens length is increased, or a desired angle of view cannot be obtained.

In view of the above, this embodiment is intended for that when the size of an effective image circle of a zoom lens becomes notedly small, i.e., when the maximum image height is lowered, trimming on a solid state image sensing device (so-called electronic zooming wherein the read-out area of the device is changed and the image of the read-out area is enlarged) is performed on the camera side in a region corresponding to the effective image circle.

With this embodiment, there is disclosed an image sensing apparatus comprising image sensing means for converting an image focused by a zoom lens into an electric signal, detection means for detecting a focal distance state of the zoom lens, and processing means for processing the electric signal for compensation corresponding to an effective picture size of the zoom lens variable depending on the focal distance state, whereby an image region corresponding to the effective picture size is enlarged on a monitor.

Figure 13:
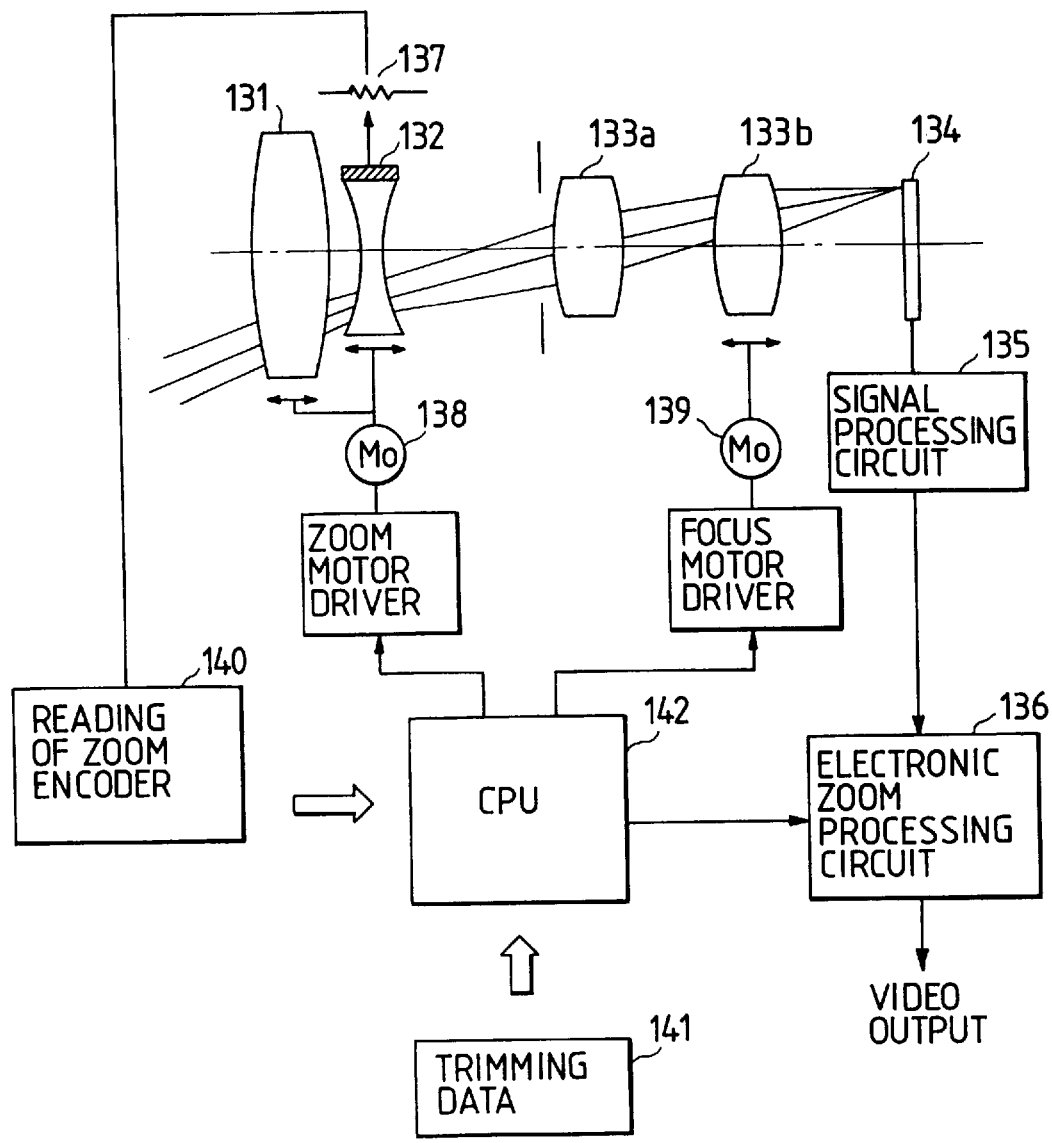
FIG. 13 is a block diagram showing a video camera according to a fourth embodiment of the present invention.

FIG. 13 is a block diagram showing the construction of a video camera according to this fourth embodiment. In FIG. 13, denoted by 131, 132 is a lens group movable for zooming, 133b is a focusing lens group for compensating movement of the image plane due to the zooming and also focusing an object at the finite distance, and 133a is a lens group kept always stationary. Further, 134 is a solid state image sensing device such as a CCD, 135 is a known signal processing circuit for processing a signal from the image sensing device, 136 is a known electronic zoom processing circuit for processing a video signal from the signal processing circuit in a digital manner to scale up or down the picture, 137 is an encoder for detecting the current zoom position, 141 is a memory means for storing data necessary for control, and 142 is a CPU for executing entire control processing.

Figure 14:
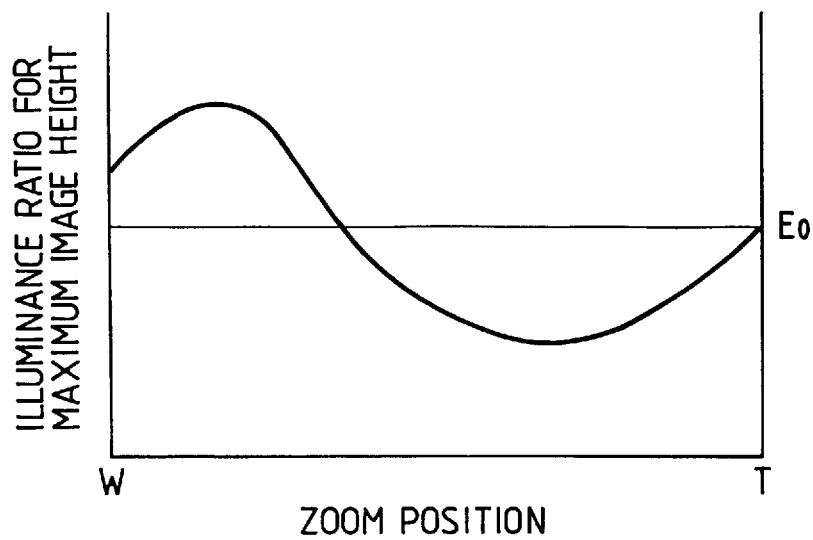
FIG. 14 is a graph showing an illuminance ratio in the image plane for maximal-off-axis light depending on zoom positions when the lens diameter is determined only by the F number of a zoom lens.

Considering now the case that the lens system is designed to have a possibly minimum diameter, i.e., a diameter determined only by an aperture ratio, illuminance can be secured at a sufficient degree for on-axis light rays, but becomes too small for off-axis light rays. This behavior is illustrated, for example, in FIG. 14. More specifically, the illuminance ratio at four corners of a TV screen (i.e., the ratio of on-axis illuminance to maximal-off-axis illuminance) is determined to $E_0$, for example, by standards, but it becomes lower than the reference illuminance ratio $E_0$ in some zoom region, as shown in FIG. 14.

Figure 15:
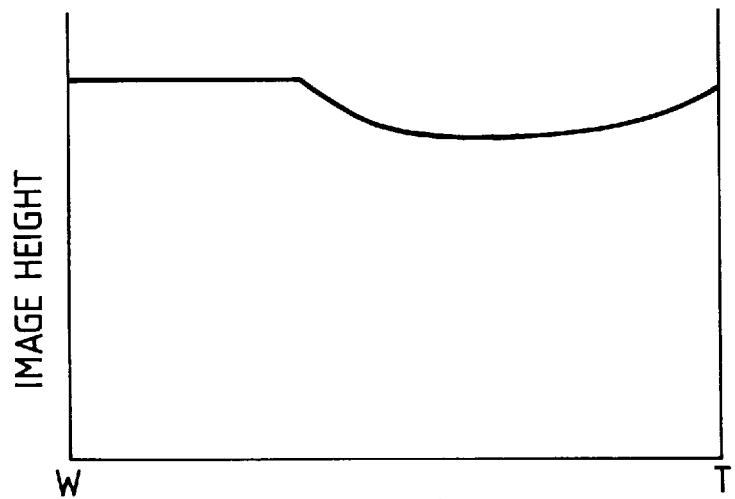
FIG. 15 is a graph showing a change in the image height depending on zoom positions where the illuminance ratio in the image plane is lower than a reference value ($E_0$).

On the other hand, illuminance in the image plane generally tends to reduce toward peripheral edges of the picture due to vignetting and the law of fourth power of cosine. In this embodiment, therefore, the actually used effective region of an image sensing device is reduced by an electric method, as shown in FIG. 15, in the zoom region where the illuminance ratio in the image plane is lower than the reference illuminance ratio $E_0$ in FIG. 14. Stated otherwise, a reference level of illuminance is secured by trimming so as to minimize an increase in the lens diameter.

Figure 16:
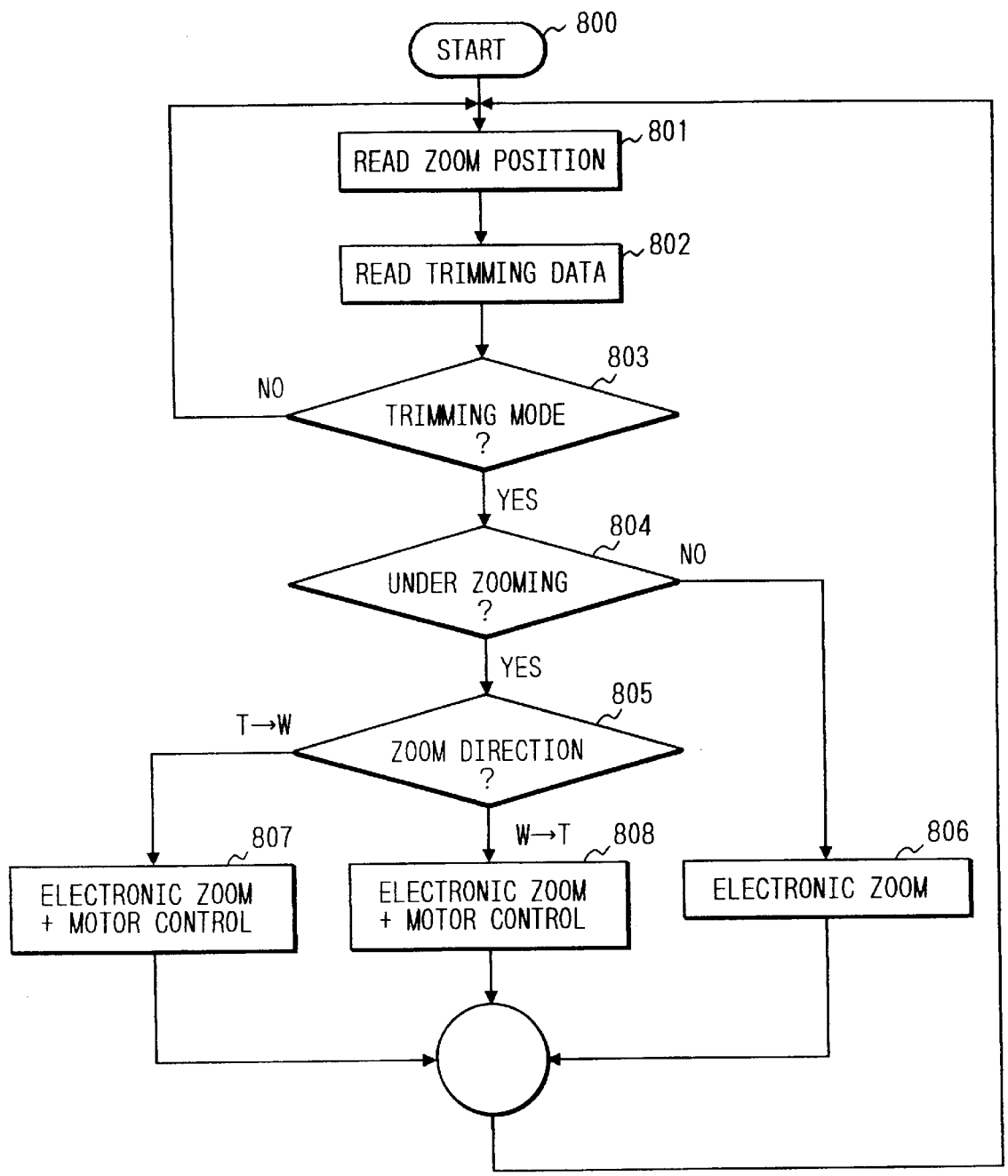
FIG. 16 is a flowchart showing a control flow for the video camera of FIG. 13.

Operation of the video camera of this embodiment will now be described by referring to a flowchart in FIG. 16. After the process has started in step 800, the zoom position (focal distance state) is first read by the zoom encoder 137. The relationship between the zoom position and the effective available maximum image height as shown in FIG. 15 is stored as trimming data in the memory means 141 beforehand in the manufacture stage. In step 802, the effective available image circle diameter corresponding to the current zoom position is read out of the memory means. Next step 803 determines whether a trimming mode is to be effected or not from a result of comparison between the image height read in step 802 and the normal effective image circle diameter of the image sensing device. If the trimming mode is not to be effected, then the flow returns to step 801.

Next step 804 determines whether the system is under zooming or not. If not under zooming, then the electronic zoom processing circuit 136 processes a signal from the signal processing circuit 135 so that a partial picture region of the image sensing device corresponding to the image height read in step 802 and sent from the CPU 142 is enlarged to the full picture size. Eventually, the resultant enlarged region is observed in a viewfinder or on a TV monitor.

In the case under zooming, to suppress abrupt changes in the angle of view caused by changing the trimming range, the zoom lens group and the focus lens group are controlled in steps 807, 808 depending on the zoom direction, along with electronic zooming, in such a manner as to realize stable and continuous changes in the angle of view. When the trimming mode is effected under optical zooming from the wide side to the tele side (W→T), for example, apparent zooming toward the tele side is abruptly performed as soon as the trimming mode has started. To avoid that, this embodiment is arranged such that under zooming from the wide side to the tele side (W→T), the zoom lens group is sped down or kept immobile, or in some cases it is moved toward the wide side, thereby achieving smooth zooming on the monitor. Conversely, under zooming from the tele side to the wide side (T→W), the zoom lens group is sped up toward the wide side down, i.e., the speed of the optical zooming toward the wide side is increased, thereby achieving smooth apparent zooming.

With the fourth embodiment, as described above, there is obtained an advantage that by reducing the effective image circle of a zoom lens and carrying out trimming on an image sensing device through processing of an electric signal at the same time in a particular zoom region, the size of the zoom lens can be reduced, while maintaining a large aperture ratio, without impeding functions as a normal zoom lens.

Next, a fifth embodiment of the present invention will be described below. This embodiment is concerned with a video camera with a function of performing focusing control under zooming.

For the purpose of reducing the camera size, recent video cameras have widely employed the so-called inner focusing lens in which rear group lenses of a lens system are moved and controlled to make focal adjustment.

In such a lens system of inner focusing type, when focusing control is to be carried out under zooming by controllable movement of a zoom lens, it is customary to previously store a locus of the in-focus position of a focus lens corresponding to the zoom lens position, as the so-called cam locus, for each of plural predetermined object distances and to controllably move the focus lens following the cam locus during zoom operation.

Also, there have been recently realized video cameras which employ both electronic zooming to change zoom magnification through an electronic process and electronic focusing to carry out focusing control through an electronic process.

The electronic zooming in that type video camera is performed as follows, for example. An optical image coming from an optical lens system is subjected photoelectric conversion by a photoelectric transducer such as a CCD, and an image signal resulted from the photoelectric conversion is taken into a memory. Then, the angle of view (i.e., the zoom magnification) is changed by enabling the image signal to be read out of a variable area in the memory and interpolating the read image signal in both the vertical and horizontal directions.

Meanwhile, the electronic focusing in that type video camera is performed as follows, for example. The image signal resulted from the photoelectric conversion is processed to hold peak values of signals respectively indicating sharpness of a rising edge component and a falling edge component in each of the vertical and horizontal directions. These peak values are compared with each other to determine whether the image is in an in-focus state or in an out-of-focus state (i.e., in a forwardly or rearwardly defocused state). When both the peak values are not equal to each other and the image is determined to be in an out-of-focus state, the focus lens is controlled to move so that both the peak values become equal to each other and the in-focus state is achieved.

In the case of carrying out the focusing control under zooming by using the cam locus as mentioned above, however, the cam locus corresponding to the zoom lens position and the focus lens position before starting the zooming is selected as one to be used. Therefore, if the state before starting the zooming is in an out-of-focus state, the cam locus corresponding to the genuine object distance is not selected and a defocused image is resulted during the zooming.

Since such a problem does not occur in video cameras employing the above-mentioned electronic zooming, it is contemplated to make the entire focusing control under zooming in an electronic manner without resorting to an optical manner.

However, there would rise a problem if the focusing control is electronically performed in its entirety, The electronic zooming has a basic disadvantage that because the angle of view is changed by interpolation as explained above, image quality in the electronic zooming is inevitably poorer than in the optical zooming.

Furthermore, the plural cam loci corresponding to the different object distances are converted toward the wide end. This raises another problem that, especially in zooming from the wide side to the tele side, it takes time to select the cam locus to be followed or, in the worst case, a false cam locus is selected and a defocused image is resulted.

Zoom lenses of recent video cameras are designed to provide higher magnifications, and tend to greatly change in magnification with a small amount of movement, particularly, in the tele side. Accordingly, if the relative positional relationship between the focus lens and the zoom lens for maintaining an in-focus state is lost during the zooming, it is predicted that an in-focus degree is lowered to a large extent even with a small amount of deviation, whereby an image may remain badly defocused during the zooming.

A conceivable still other problem is as follows. When such a zoom lens having high magnification is mounted on video cameras as a standard model, it is not unusual to make panning over plural objects at different distances, or to perform both panning and zooming at the same time. In these cases, a difficulty is increased in maintaining the relative positional relationship between the focus lens and the zoom lens. Also, in the case of repeating both panning and zooming between particular objects, if the zooming is performed for each time, it takes time in focusing, whereby a defocused image may be photographed for a long period of time.

This fifth embodiment has been made in view of the state of art, and it is intended to surely carry out focusing control under zooming over the entire adjustable range of zoom magnification without degrading image quality.

To that end, a video camera of the fifth embodiment comprises, for each of plural object distances, memory means for storing loci of in-focus positions of a focus lens corresponding to plural positions of a zoom lens, first drive means for driving the zoom lens, second drive means for driving the focus lens, electronic zooming means for performing zoom control based on a video signal obtained by photographing, first control means for performing zoom control by the electronic zooming means in an initial stage of zooming and simultaneously driving the focus lens by the second drive means to perform focusing control, selection means for selecting the locus in the memory means corresponding to positions of the zoom lens and the focus lens at the time the control by the first control means has ended, when the zoom control is performed in succession to the zoom control in the initial stage by the first control means, and second control means for controlling the first drive means to move the zoom lens and simultaneously controlling the second drive means so that the focus lens moves following the zoom lens in accordance with the locus selected by the selection means.

In other words, the first control means serves to perform zoom control by the electronic zooming means in an initial stage of zooming and simultaneously drive the focus lens by the second drive means to perform focusing control, thereby changing an out-of-focus state before the zooming into an in-focus state. Then, when the zoom control is performed in succession to the zoom control in the initial stage by the first control means, the select means serves to select the locus in the memory means corresponding to positions of the zoom lens and the focus lens at the time the control by the first control means has ended.

Further, the second control means serves to control the first drive means to move the zoom lens and simultaneously control the second drive means so that the focus lens moves following the zoom lens in accordance with the locus selected in the in-focus state.

Thus, since the focus lens is moved following the zoom lens in accordance with the locus selected in the in-focus state, focusing control under zooming can be surely performed over the entire adjustable range of zoom magnification without degrading image quality.

[Fifth Embodiment]

Figure 17:
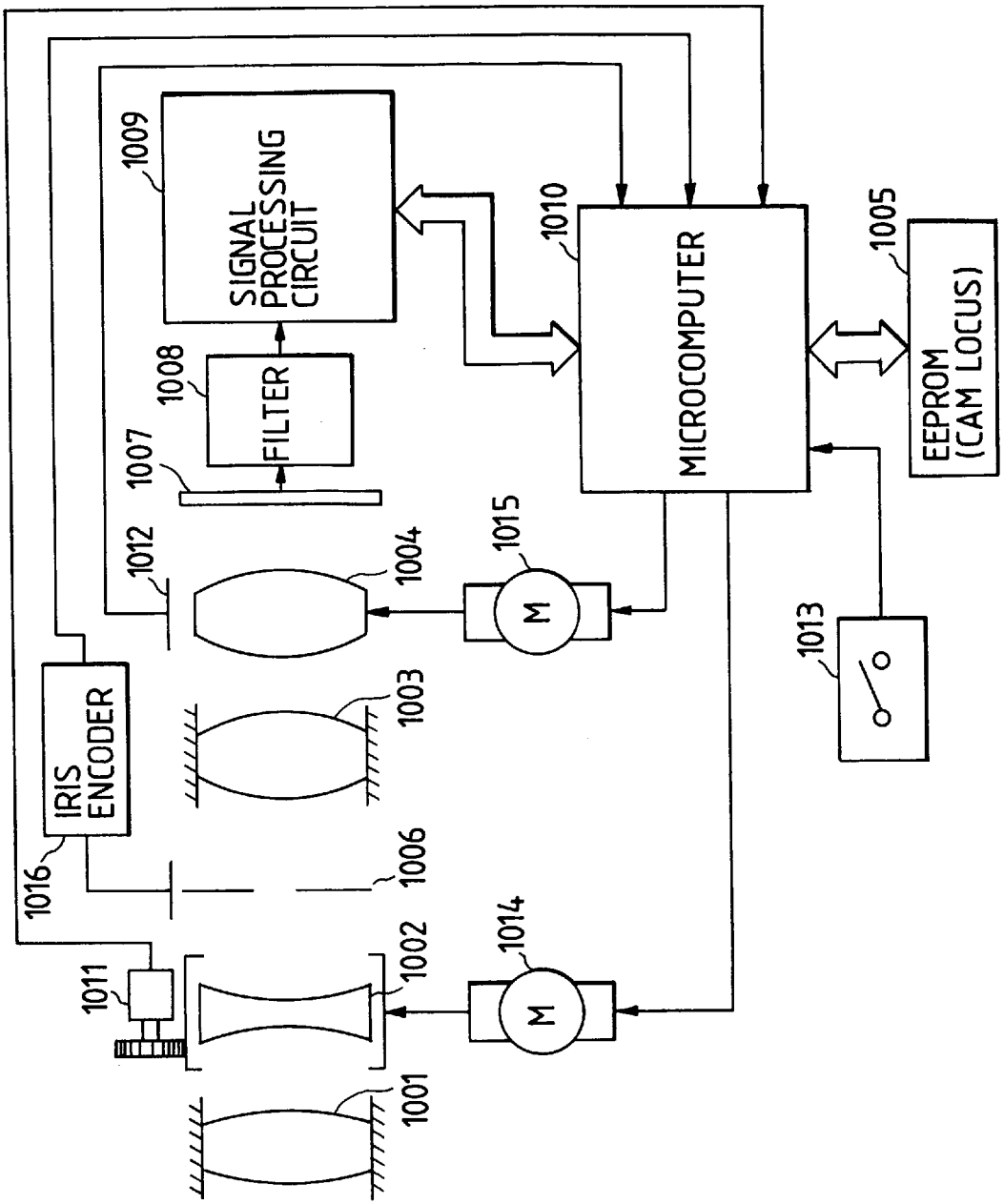
FIG. 17 is a block diagram showing the schematic construction of a video camera according to a fifth embodiment of the present invention.

FIG. 17 is a block diagram showing the schematic construction of a video camera according to the fifth embodiment of the present invention.

A lens system of inner focusing type comprises a first fixed lens group 1001, a zoom lens group 1002, a second fixed lens group 1003, and a focus lens group 1004. In this lens system, the focus lens group 1004 is so arranged as to perform not only a function of focal adjustment, but also the so-called compensation function of compensating a shift of the focal plane due to movement of the zoom lens group 1002, when the zoom lens group 1002 is moved to carry out zooming.

Figure 18:
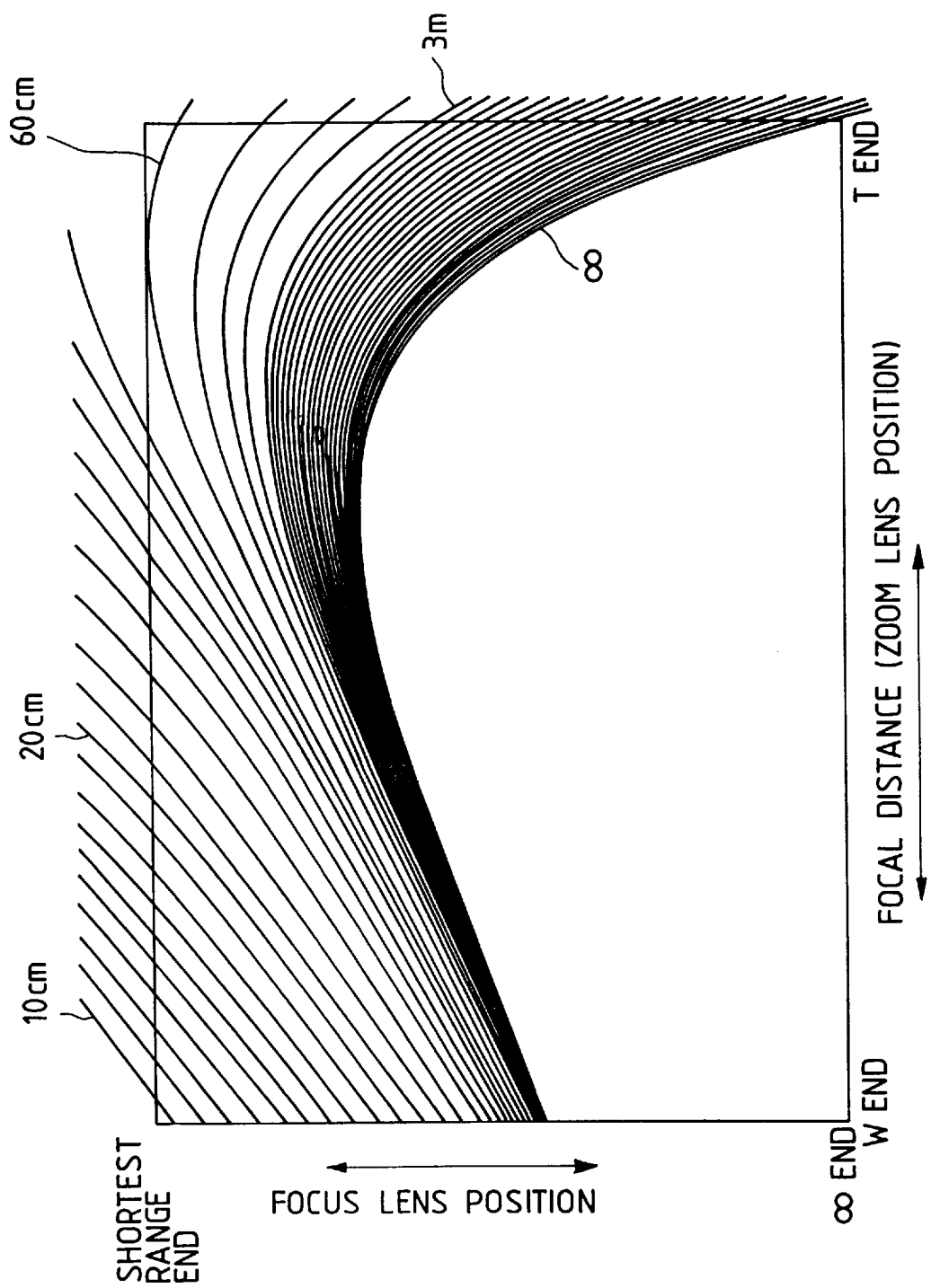
FIG. 18 is a graph showing cam loci utilized in focusing control under zooming.

FIG. 18 is a graph showing cam loci utilized when the focus lens group 1004 carries out its compensation function, in which the horizontal axis represents a position of the zoom lens group 1002 and the vertical axis represents a position of the focus lens group 1004. A cam locus indicating the relationship between respective positions of the zoom lens group 1002 and the focus lens group 1004 is plotted for each of object distances.

The plotted cam locus indicates a locus of the in-focus position of the focus lens group 1004 corresponding to the position of movement of the zoom lens group 1002. By controlling the focus lens group 1004 to be moved following the plotted cam locus when the zoom lens group 1002 moves for zooming, the focal adjustment is realized while compensating a shift of the focal plane due to the movement of the zoom lens group 1002. In practice, the cam locus is given by presetting values sampled with predetermined intervals in an EEPROM 1005 and determining values at other points than the sampling points by interpolation.

An optical image coming through the above lens system and an iris 1006 is subjected to photoelectric conversion by a CCD 1007, and a video signal resulted from the photoelectric conversion enters a filter 1008 to pass a predetermined frequency component, followed by various kinds of signal processing in a signal processing circuit 1009.

A microcomputer 1010 takes the video signal output from the signal processing circuit 1009 into a built-in memory (not shown), and functions to change the angle of view (i.e., the zoom magnification), namely, perform zooming in an electronic manner, by enabling the video signal to be read out of a variable area in the memory and interpolating the read video signal in both the vertical and horizontal directions.

The microcomputer 1010 also recognizes respective positions of the zoom lens group 1002 and the focus lens group 1004 based on signals from a zoom encoder 1011 and a focus encoder 1012. After manipulating a zoom switch, when a later-described predetermined condition is satisfied, a zoom motor 1014 is controlled by the microcomputer 1010 to move the zoom lens, group 1002 in response to the switch manipulation. At this time, the cam locus corresponding to the recognized positions of the zoom lens group 1002 and the focus lens group 1004 is read out of the EEPROM 1005, and a zoom motor 1015 is also controlled so that the focus lens group 1004 moves following the zoom lens group 1002 in accordance with the cam locus read out. Based on a signal from an iris encoder 1016, the microcomputer 1010 further adjusts an opening degree of the iris 1006 while confirming the current position of the iris 1006. Thus, the video camera of this embodiment is so constructed as to enable both electronic zooming and optical zooming.

In addition, the microcomputer 1010 is programmed to hold peak values of signals respectively indicating sharpness of a rising edge component and a falling edge component for the video output from the signal processing circuit 1009 in each of the vertical and horizontal directions, and then compare those peak values with each other to determine whether the image is in an in-focus state or in an out-of-focus state (i.e., in a forwardly or rearwardly defocused state). When both the peak values are not equal to each other and the image is determined to be in an out-of-focus state, the focus lens group 4 is controlled to move so that both the peak values become equal to each other and the in-focus state is achieved.

Figure 19:
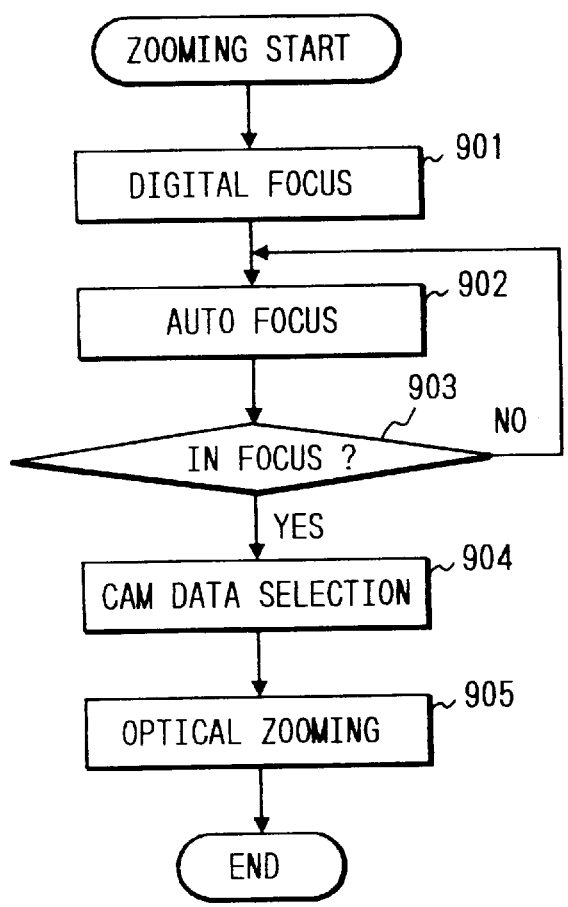
FIG. 19 is a flowchart showing focusing control operation under zooming specific to the fifth embodiment.

A description will now be given of focusing control operation under zooming specific to the fifth embodiment by referring to a flowchart of FIG. 19.

When a zoom switch 1013 is manipulated, the microcomputer 1010 first executes the electronic zooming (step 901). Focusing control is performed based on the above-mentioned signals indicating sharpness (step 902), and whether the in-focus state is now achieved or not (step 903). If the in-focus state is not achieved, then the flow returns to step 902 for continuation of the focusing control.

On the other hand, if the in-focus state is achieved, then the cam locus corresponding to the current positions of the zoom lens group 1002 and the focus lens group 1004 is selected and read out of the EEPROM 1005 (step 904). Then, the zoom motor 1014 and the focus motor 1015 are controlled so that the focus lens group 1004 moves following the movement of the zoom lens group 1002 exactly in accordance with the cam locus read out (step 905), followed by ending the process.

As explained above, with the fifth embodiment, the focus lens group 1004 is moved following the zoom lens group 1002 in accordance with the cam locus selected in the in-focus, i.e., the cam locus corresponding to the genuine object distance. Accordingly, there will not produce a defocused image during the zooming. In addition, since the zoom control is optically performed, image quality will not degrade. Moreover, since the zoom control is electronically performed in the initial stage of zooming, the cam locus can be quickly selected and high-speed zooming is enabled, particularly, even in zooming from the wide side to the tele side.

It should be noted that this embodiment is not limited to the foregoing form and may be modified, for example, to select the cam locus after a predetermined period of time has elapsed from start of the zooming, rather than selecting the cam locus after confirmation of the in-focus state.

Next, a sixth embodiment of the present invention will be described below. The sixth embodiment of the present invention provides another means for solving the problem explained above in connection with the fifth embodiment, and it is intended to store the positions of focus and zoom lenses corresponding to the preset object distance and magnification and move those lenses momentarily to their corresponding positions to thereby enable high-speed control without causing a blur.

Specifically, a video camera of this embodiment comprises memory means for storing a position of a zoom lens and an in-focus position of a focus lens corresponding to the position of the zoom lens at an arbitrary instant in time during photographing, first drive means for driving the zoom lens, second drive means for driving the focus lens, instruction means for instructing lens movement in accordance with the data stored in the memory means, and control means for, in response to an instruction from the instruction means, controlling the first drive means to move the zoom lens to the position stored in the memory means and controlling the second drive means to move the focus lens to the in-focus position stored in the memory means when the zoom lens is moved.

In other words, when lens movement is instructed by the instruction means in accordance with the data stored in the memory means, the control means controls the first drive means for moving the zoom lens to the position stored in the memory means and also controls the second drive means for moving the focus lens to the in-focus position stored in the memory means.

Thus, since both the position of the zoom lens and the in-focus position of the focus lens at an arbitrary instant in time during photographing are stored and both the lenses can be moved to the stored positions through respective paths of the shortest distance, high-speed transfer to the photographing conditions stored in advance is enabled.

Further, the video camera of this embodiment is provided with inhibit means for inhibiting recording while the zoom lens and the focus lens are being moved under control of the control means.

[Sixth Embodiment]

Figure 20:
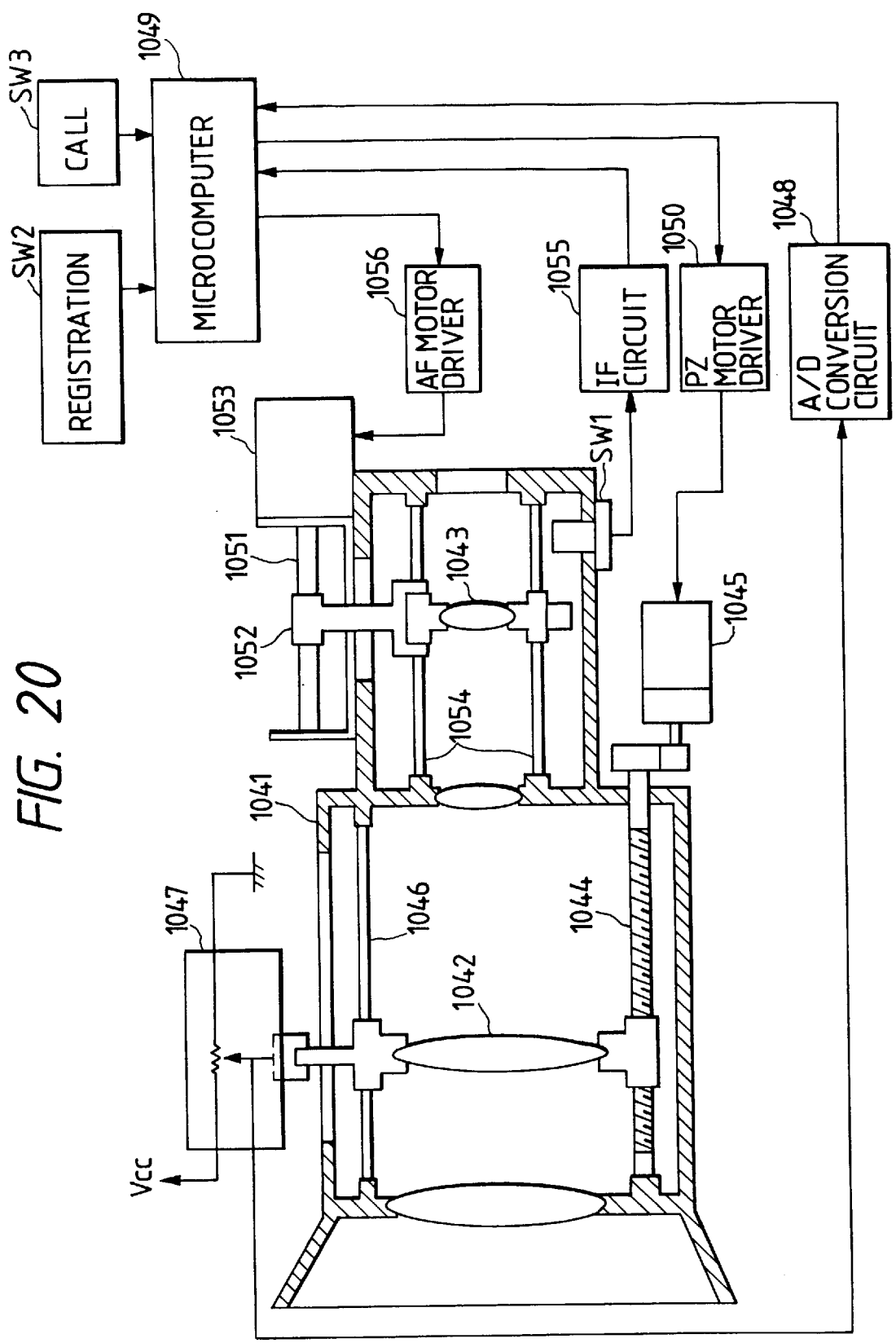
FIG. 20 is a block diagram showing the schematic construction of a video camera according to a sixth embodiment of the present invention.

FIG. 20 is a block diagram showing the schematic construction of the video camera according to the sixth embodiment of the present invention.

In a lens barrel 1041, there are disposed a zoom lens group 1042 and a focus lens group 1043. The zoom lens group 1042 is held in mesh with a zoom screw 1044 and movable in the direction of the optical axis while being guided by a guide bar 1046, when the zoom screw 1044 is rotated by a zoom motor 1045. The position of the zoom lens group 1042 is detected by a zoom encoder 1047 comprising a potentiometer. A detected position signal (in the form of an analog signal) is converted into a digital signal by an A/D conversion circuit 1048 and input to a microcomputer 1049. Additionally, the zoom motor 1045 is driven by a PZ motor driver 1050 under control of the microcomputer 1049.

The focus lens group 1043 is supported by a rack 1052 held in mesh with a focus screw 1051 and movable in the direction of the optical axis while being guided by a guide bar 1054, when the focus screw 1051 is rotated by a focus motor 1053. The position of the focus lens group 1043 is detected as follows. On condition that the position of a reset switch SW1 comprising a photointerrupter is an initial position, when a switch-on signal of the reset switch SW1 is input to the microcomputer 1049 via an interface (IF) circuit 1055, the microcomputer 1049 resets a focus absolute address counter FC (not shown) to "0". Then, each time a pulse signal is output to an AF motor driver 1056 for forwardly rotating the focus motor 1053 by one step, the focus absolute address counter FC is incremented by one (+1). The microcomputer 1049 also has a zoom absolute address counter ZC for managing the position of the zoom lens group 1042.

In addition to the focus absolute address counter FC and the zoom absolute address counter ZC, the microcomputer 1049 has a registration memory M (not shown) into which a position of the zoom lens group 1042 corresponding to any desired object distance set by a user (hereinafter referred to as a zoom registration position) and an in-focus position of the focus lens group 1043 corresponding to the zoom registration position (hereinafter referred to as a focus registration position) are both set and registered. These setting and registration are made by manipulating a registration switch SW2. Upon a call switch SW3 being manipulated, the zoom lens group 1042 and the focus lens group 1043 are moved to the zoom registration position and the focus registration position, respectively, which have been registered beforehand.

Figure 21:
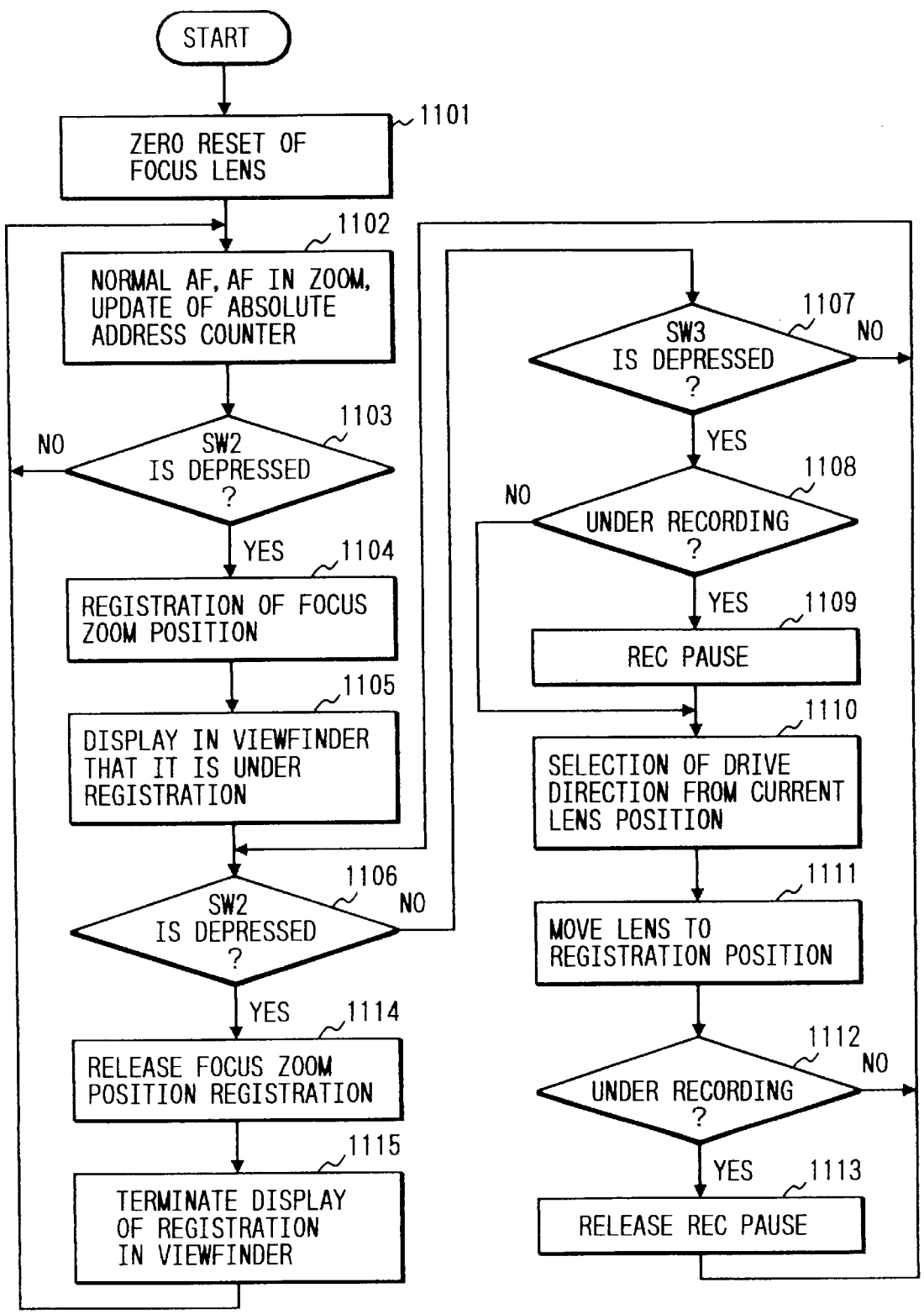
FIG. 21 is a flowchart showing focusing control operation under zooming specific to the sixth embodiment.

A description will now be given of focusing control operation under zooming specific to the sixth embodiment of the present invention by referring to a flowchart of FIG. 21.

When a power supply is turned on, the microcomputer 1049 first moves the focus lens group 1043 to the initial position where the reset switch SW1 is disposed, and resets the focus absolute address counter FC to "0" (step S1101). Then, the microcomputer performs normal automatic focusing (AF) control when the zoom switch SW1 is not turned on, or AF control for zooming when the zoom switch SW1 is turned on, etc. (step S1102). At this time, whenever the focus lens group 1043 and the zoom lens group 1042 are moved, the contents of the focus absolute address counter FC and the zoom absolute address counter ZC are respectively updated.

Figure 22:
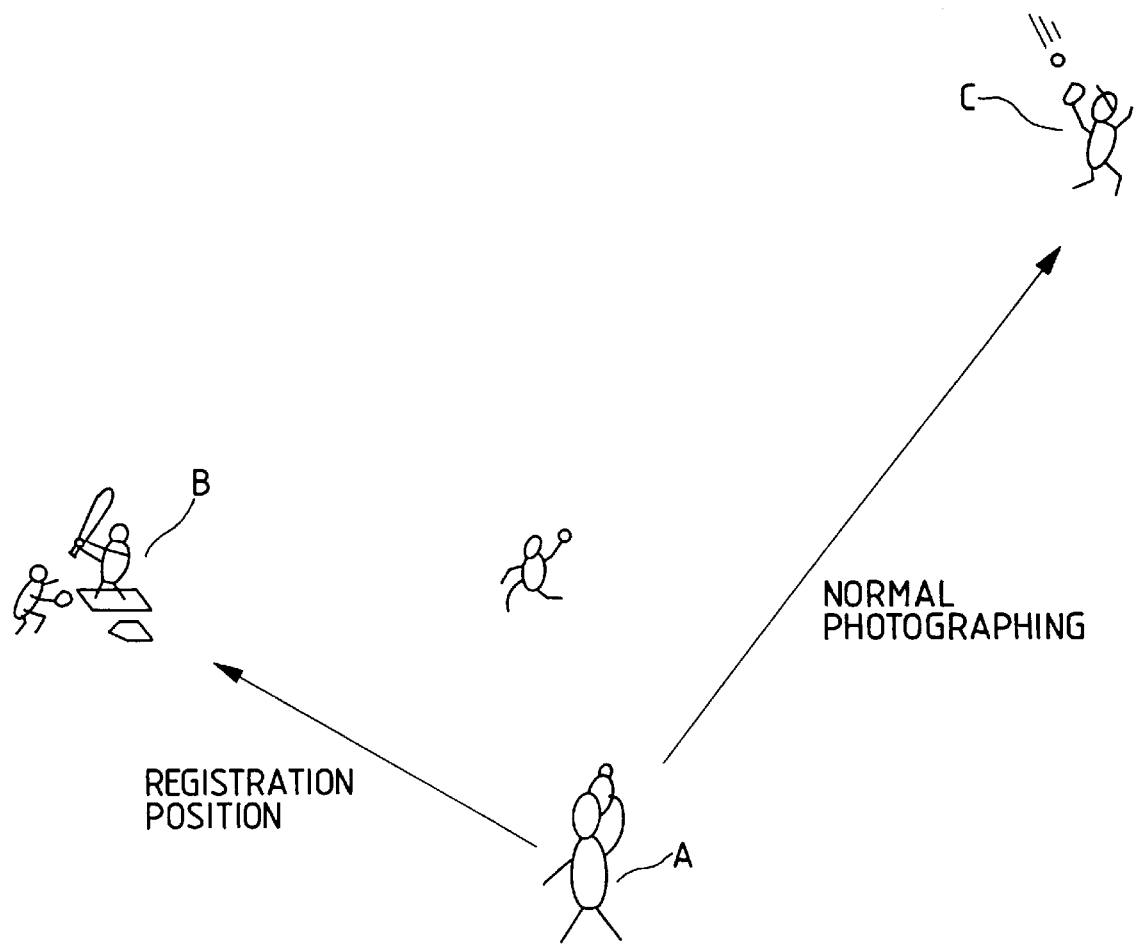
FIG. 22 is an illustration for explaining an example of registration of the position of a zoom lens corresponding to a predetermined object distance and the in-focus position of a focus lens corresponding to that zoom lens position.

After that, it is determined whether the registration switch SW2 is turned on or not (step S1103). If not, then the flows returns to step S1102 for performing the AF control, etc. On the other hand, if the registration switch SW2 is turned on, then the current focus absolute address in the focus absolute address counter FC and the current zoom absolute address in the zoom absolute address counter ZC are set and registered as the zoom registration position and the focus registration position, respectively, into the registration memory M (step S1104). Thus, as shown in FIG. 22, just by directing the video camera toward the object B at the desired object distance and turning on the registration switch SW2, a photographer A can automatically register the position of the zoom lens group 1042 (i.e., the desired zoom magnification) corresponding to an object B at a desired object distance and the in-focus position of the focus lens group 1043 corresponding to the object B at the desired object distance under that zoom magnification.

Figure 23:
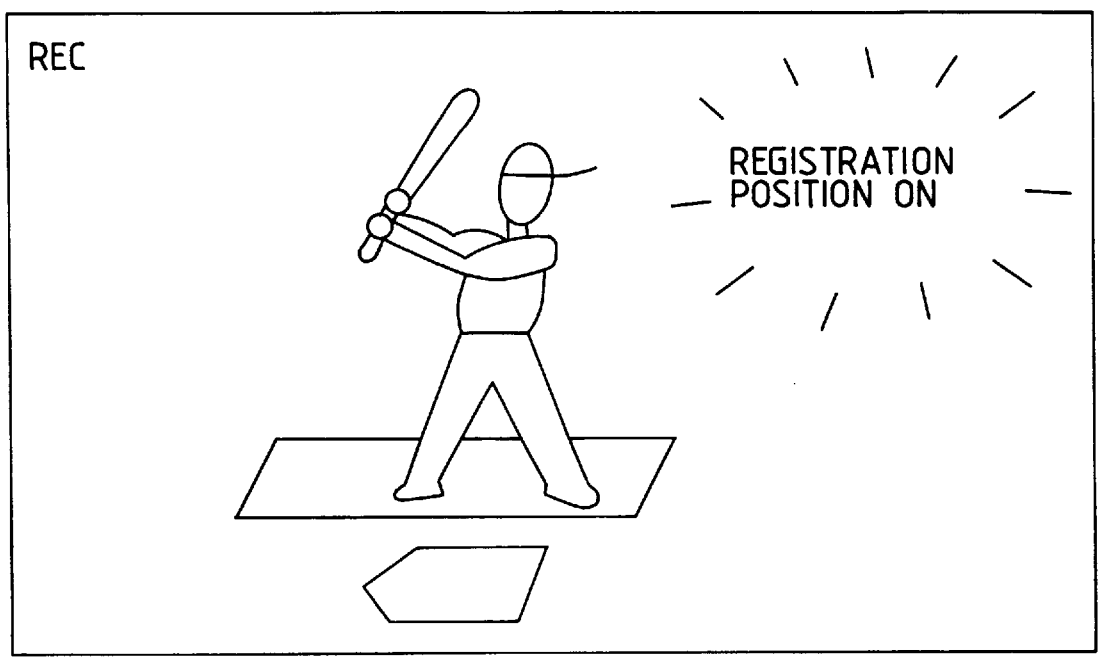
FIG. 23 is an illustration showing an example of display on a viewfinder when registration has been made.

Subsequently, as shown in FIG. 23, "REGISTRATION ON" is displayed in a viewfinder to clearly inform the photographer of that the registration has been made (step S1105). Thereafter, for determining whether the photographer requests to cancel the registered contents and update the registration or not, whether the registration switch SW2 is turned on or not is determined again (step S1106). If the result of this determination shows that the registration switch SW2 is not turned on and the update registration is not requested at the present, then whether the call switch SW3 is turned on or not is determined (step S1107). If the call switch SW3 is not turned on as a result of the determination, then the flow returns to step S1106 for determining whether the update registration is requested or not.

If the call switch SW3 is turned on, it is determined whether the mode is under recording or not (step S1108). If under recording, then the recording is paused (step S1109). After that, the directions in which the lenses are to be moved from the current position of the zoom lens group 1042 and the current position of the focus lens group 1043 (e.g., the position corresponding to C in FIG. 23) toward the zoom registration position and the focus registration position (e.g., the position corresponding to B in FIG. 23) are selected (step S1110). On the other hand, if not under recording, then the flow skips step S1109 and goes to step S1110 for selecting the directions in which the lenses are to be moved.

Subsequently, the PZ motor driver 1050 and the AF motor driver 1056 are controlled so that the zoom lens group 1042 and the focus lens group 1043 are moved to the zoom registration position and the focus registration position, respectively (step S1111). At this time, since the target positions to which the zoom lens group 1042 and the focus lens group 1043 are moved are known beforehand and both the lens groups can be moved to the target positions via the shortest paths, it is possible to carry out the focusing control under zooming at a high speed. Stated otherwise, the zoom lens group 1042 and the focus lens group 1043 can be rapidly moved to the photographing conditions which have been stored in advance.

Thereafter, whether the mode is under recording or not again is determined (step S1112). If under recording, then the recording pause is released (step S1113), followed by returning to step S1106. If not under recording, then the flow returns to step S1106 at once. If the registration switch SW2 is determined to be turned on in step S1106, then this is considered as request for the update registration, the zoom registration position and the focus registration position in the registration memory M are erased (step S1114), and further "REGISTRATION ON" displayed in the viewfinder is terminated (step S1115), followed by returning to step S1102.

By thus pausing the recording when the focusing control under zooming is performed, there will not produce a defocused image which has been produced in the case of changing the angle from the position C to the position B in FIG. 22, for example, so that the photographer is kept from feeling uncomfortable. Also, since the recording is paused and a fear of recording motor noise is not present, the lenses can be moved to their registration positions at a high speed without need of paying care to such motor noise.

Note that while positions of a zoom lens and a focus lens at one instant in time are registered and stored in this embodiment, it is also of course possible to register and store the positions of the zoom lens and the focus lens at plural instants in time. In this case, it is preferable to provide plural call switches respectively corresponding to the plural instants in time for quickly specifying desired photographing conditions, rather than specifying the plural instants in time by numbering them.

With this embodiment, as described above, since a focus lens is moved following a zoom lens in accordance with the locus selected in the in-focus state, focusing control under zooming can be surely carried out over the entire adjustable range of zoom magnification without degrading image quality. Also, since both the position of the zoom lens and the in-focus position of the focus lens at an arbitrary instant in time during photographing are registered (stored) and both the lenses can be moved to the stored positions through respective paths of the shortest distance, high-speed transfer to the photographing conditions stored in advance is enabled. Furthermore, since recording is inhibited while the focusing control is being performed under zooming, there will not produce a defocused image which has been produced in the case of making the focusing control under zooming when the photographing angle is changed while panning from an object at the different object distance to an object at the object distance stored, for example, with the result of that the photographer is kept from feeling uncomfortable.

What is claimed is:

1. An image sensing apparatus comprising:
   image sensing means;
   electronic zooming means having an electronic zooming function for an output of said image sensing means;
   an optical system for changing a focal distance; and
   control means for controlling said electronic zooming means in such a manner that said electronic zooming means is driven to change magnification of the electronic zooming function to the wide side when the focal distance is changed by said optical system to the wide side in the case that said optical system is positioned at the tele end.

2. An apparatus according to claim 1, wherein said electronic zooming means variably changes a read out range of an image stored in a memory to perform reduction and magnification of the image.

3. An apparatus according to claim 2, wherein said electronic zooming means includes means for interpolating the read-out image when the magnification and rejection is performed by variably changing the read-out range of the image stored in the memory.

4. An apparatus according to claim 1, wherein said optical system is a zoom lens.

5. An apparatus according to claim 1, wherein said control means sets magnification of said electronic zooming means at one times when said optical system is driven toward the wide side in case that said optical system is positioned at the tele end.

6. An apparatus according to claim 1, wherein said control means drives said electronic zooming means toward the wide end in parallel with said optical system when said optical system reaches the tele end and then drive toward the wide end with said electronic zooming means being operated.

7. A video camera comprising:
   a zoom lens,
   an image sensing means,
   detection means for detecting a focal distance of said zoom lens, and
   processing means for processing a sensed image signal output from said image sensing means, according to the focal distance detected by said detection means, to correct an effective picture size of said image sensing means.

8. A camera according to claim 7, wherein said processing means includes electronic zooming means for electronically enlarging an image corresponding to the image signal.

9. A camera according to claim 7, wherein said detecting means is a zoom encoder.

10. A camera according to claim 7, wherein said processing means includes a memory for storing relationship between the focal distance and the effective picture size.

11. A camera according to claim 10, wherein said processing means change magnification ratio of an image according to the effective picture size to maintain an output image size constant.

12. An image sensing apparatus comprising:

image sensing means;

electronic zooming means having an electronic zooming function for an output of said image sensing means;

an optical system for changing a focal distance; and control means for controlling said electronic zooming means in such a manner that said electronic zooming means is driven to change magnification of the electronic zooming function to the wide side when the focal distance is changed by said optical system in the case that said electronic zooming means is activated.

13. An apparatus according to claim 12, wherein said electronic zooming means variably changes a read-out range of an image stored in a memory to perform magnification and reduction of the image.

14. An apparatus according to claim 12, wherein said optical system is a zoom lens.

15. An apparatus according to claim 12, wherein said control means sets magnification of said electronic zooming means at one times when said optical system is driven toward the wide end with said optical system being positioned at the tele end.

16. An apparatus according to claim 15, wherein said control means drives said electronic zooming means toward the wide end in parallel with said optical system when said optical system reaches the tele end and then driven toward the wide end with said electronic zooming means being operated.

17. A camera control device for controlling a camera, comprising:

(a) zoom control means for controlling a zoom lens provided in said camera;

(b) receiving means for receiving an image signal output from an image sensing means provided in said camera and a focal distance of said zoom lens; and (c) processing means for processing a sensed image signal output from said receiving means according to the focal distance received by said receiving means, to correct an effective picture size of said image sensing means.

18. A device according to claim 17, wherein said processing means includes electronic zooming means for electronically enlarging an image corresponding to the image signal.

19. A device according to claim 17, wherein said processing means includes a memory for storing relationship between the focal distance and the effective picture size.

20. A device according to claim 19, wherein said processing means changes a magnification ratio according to the effective picture size to maintain an output image size constant.

* * * * *